US009990205B2

(12) United States Patent
Park et al.

(10) Patent No.: US 9,990,205 B2
(45) Date of Patent: *Jun. 5, 2018

(54) SYSTEM ON CHIP AND VERIFICATION METHOD THEREOF

(71) Applicant: Samsung Electronics Co., Ltd., Suwon-si, Gyeonggi-do (KR)

(72) Inventors: Sung-Boem Park, Seoul (KR); Jin-Sung Park, Yongin-si (KR); Ara Cho, Gwangyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/257,063

(22) Filed: Sep. 6, 2016

(65) Prior Publication Data

US 2016/0371092 A1    Dec. 22, 2016

Related U.S. Application Data

(63) Continuation of application No. 14/680,337, filed on Apr. 7, 2015, now Pat. No. 9,448,917.

(Continued)

(30) Foreign Application Priority Data

Jul. 21, 2014 (KR) ........................ 10-2014-0091962

(51) Int. Cl.
*G06F 9/38*   (2018.01)
*G06F 11/36*  (2006.01)
*G06F 9/30*   (2018.01)

(52) U.S. Cl.
CPC ........ *G06F 9/3865* (2013.01); *G06F 9/30145* (2013.01); *G06F 11/3688* (2013.01)

(58) Field of Classification Search
None
See application file for complete search history.

(56) References Cited

U.S. PATENT DOCUMENTS 6,606,721 B1   8/2003   Gowin, Jr. et al.
6,871,298 B1   3/2005   Cavanaugh et al.
(Continued)

OTHER PUBLICATIONS

P. Parvathala, "FRITS—a microprocessor functional BIST method", Proc. of International Test Conference, 2002, 9 pages.

(Continued)

*Primary Examiner* — Daxin Wu
(74) *Attorney, Agent, or Firm* — Harness, Dickey & Pierce, P.L.C.

(57) ABSTRACT

A verification method of a system on chip includes receiving a test generator and an exception handler; generating, by the test generator, a test program including an exception-causing instruction based on a test template; executing a first instruction at a first operating state as the test program is executed; stopping the execution of the test program and performing a fixed instruction sequence included in the exception handler when the exception-causing instruction is executed during the execution of the test program; and resuming the test program from a second instruction at a second operating state set after the fixed instruction sequence is performed, the second instruction corresponding to an address adjacent to an address of the exception-causing instruction.

4 Claims, 17 Drawing Sheets

Related U.S. Application Data

(60) Provisional application No. 61/977,223, filed on Apr. 9, 2014.

(56) References Cited

U.S. PATENT DOCUMENTS

| | | |
|---|---|---|
| 6,928,638 B2 | 8/2005 | Parvathala et al. |
| 7,627,843 B2 | 12/2009 | Dozorets et al. |
| 7,761,855 B2 | 7/2010 | Kalra |
| 7,945,888 B2 | 5/2011 | Adir et al. |
| 7,958,422 B2 | 6/2011 | Betawar et al. |
| 8,161,440 B2 | 4/2012 | Emek et al. |
| 8,359,456 B2 | 1/2013 | Adir et al. |
| 8,397,217 B2 | 3/2013 | Goryachev et al. |
| 8,601,433 B2 | 12/2013 | Son et al. |
| 2003/0074650 A1* | 4/2003 | Akgul ............ G06F 11/3624 717/129 |
| 2003/0149946 A1* | 8/2003 | Devins ............ G06F 17/5022 716/106 |
| 2004/0088600 A1* | 5/2004 | Adir ............ G06F 17/5022 714/1 |
| 2005/0216895 A1* | 9/2005 | Tran ............ G06F 11/362 717/127 |
| 2005/0262410 A1* | 11/2005 | Parvathala ............ G06F 11/263 714/738 |
| 2008/0133206 A1* | 6/2008 | Devins ............ G06F 17/5022 703/15 |
| 2008/0189528 A1 | 8/2008 | Robinson |
| 2008/0313583 A1* | 12/2008 | Brinson ............ G06F 11/261 716/136 |
| 2009/0064149 A1 | 3/2009 | Singh et al. |
| 2012/0131403 A1* | 5/2012 | Chin ............ G01R 31/31853 714/727 |
| 2012/0159251 A1* | 6/2012 | Wu ............ G06F 11/2236 714/30 |
| 2012/0216023 A1 | 8/2012 | Bansal et al. |
| 2013/0267179 A1* | 10/2013 | Parekh ............ H04W 24/08 455/67.11 |

OTHER PUBLICATIONS

A. Adir, "Genesys-Pro: innovations in test program generation for function processor verification", IEEE Design & Test of Computers vol. 21, Issue 2, 10 pages.

A. Adir, "Threadmill: a post-silicon exerciser for multi-threaded processors", Proc. of Design Automation Conference, 2011, 9 pages.

* cited by examiner

FIG. 8

| Processor | Physical ID | Virtual ID | | | |
|---|---|---|---|---|---|
| | | Migration | | Swap | |
| Processor 1 | 1 | 3 | 3 | 3 | 3 |
| Processor 2 | 2 | 6 | 6 | 6 | 4 |
| Processor 3 | 3 | 1 | Undefined | 1 | 1 |
| Processor 4 | 4 | 7 | 7 | 7 | 7 |
| Processor 5 | 5 | Undefined | 1 | 8 | 8 |
| Processor 6 | 6 | 4 | 4 | 4 | 6 |
| Processor 7 | 7 | 5 | 5 | 5 | 5 |
| Processor 8 | 8 | 2 | 2 | 2 | 2 |

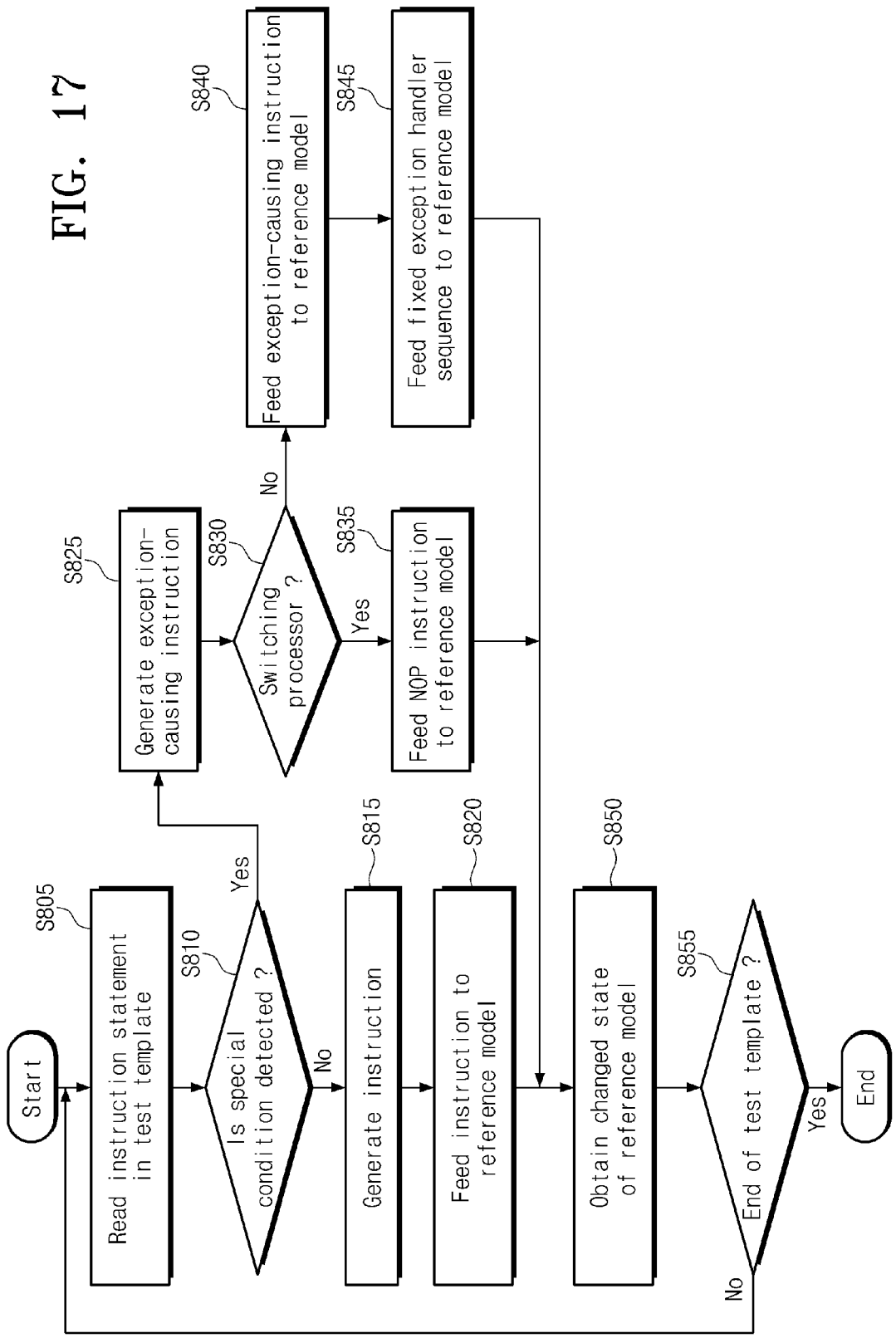

SYSTEM ON CHIP AND VERIFICATION METHOD THEREOF

CROSS-REFERENCE TO RELATED APPLICATIONS

This application is a continuation application of U.S. application Ser. No. 14/680,337, filed Apr. 7, 2015, which claims priority under 35 U.S.C. § 119 to U.S. Provisional Application No. 61/977,223, filed Apr. 9, 2014, and to Korean Patent Application No. 10-2014-0091962, filed Jul. 21, 2014 in the Korean Intellectual Property Office, the entire contents of each of which are hereby incorporated by reference in their entirety.

BACKGROUND

The inventive concepts described herein relate to a system on chip and a verification method thereof.

With the advancement of the semiconductor process, a semiconductor integrated circuit has been developed in the form of a system on chip (SoC), which is a single integrated chip (IC) including a processor, a cache memory, an input/output interface, etc. If the processor and the cache memory are integrated in a single chip, the data input/output speed may be improved, thereby making the whole performance of the processor improved. However, deficiencies of a semiconductor IC may arise due to an imbalance of the fabrication process. Thus, it is necessary to illuminate causes of the deficiencies that may be caused due to the fabrication process.

Some SoCs may include a plurality of processors, where each processor operates while changing a plurality of privilege levels or a plurality of instruction sets. Thus, it is advantageous to include, in the SoC, a method of automatically verifying the SoC with consideration for the plurality of processors, the plurality of privilege levels, and/or the plurality of instruction sets.

SUMMARY

At least one example embodiment relates to a verification method of a system on chip (SoC).

According to at least one example embodiment, a verification method of a system on chip (SoC) includes receiving, by a processor included in the system on chip, a test generator and an exception handler; generating, by the processor including the test generator, a test program including an exception-causing instruction based on a test template; executing, by the processor, a first instruction at a first operating state as the test program is executed; stopping, by the processor, the execution of the test program when the exception-causing instruction is executed during the execution of the test program; performing, by the processor, a fixed instruction sequence included in the exception handler when the exception-causing instruction is executed during the execution of the test program; and resuming the test program from a second instruction at a second operating state set after the fixed instruction sequence is performed, the second instruction having an address next to an address of the exception-causing instruction.

At least one example embodiment provides that the resuming the test program includes, as a change from the first operating state to the second operating state is made, executing the second instruction (i) on another processor different than the processor executing the first instruction, or (ii) being executed using at least one of a privilege level different from a privilege level of the first instruction and an instruction set different from an instruction set of the first instruction.

At least one example embodiment provides that the generating the test program includes reading a first instruction statement included in the test template; generating the first instruction corresponding to the first instruction statement such that the first instruction is performed at the first operating state; reading a state modifying instruction statement included in the test template; generating the exception-causing instruction, the exception-causing instruction including a switch intention about an operating state, the switch intention about the operating state indicating to change a state of operation of the system on chip, the switch intention about the operating state corresponding to the state modifying instruction statement; reading a second instruction statement next to the state modifying instruction statement; and generating the second instruction corresponding to the second instruction statement such that the second instruction is performed at the second operating state at an address adjacent to an address of the exception-causing instruction.

At least one example embodiment provides that the switch intention is detected using a first sub-component of the test generator.

According to at least one example embodiment, a verification method of a system on chip, which includes a processor and supports at least two instruction sets, includes receiving, by the processor, a test generator and an exception handler; generating, by the processor including the test generator, a test program including an exception-causing instruction based on a test template; executing, by the processor, a first instruction, the first instruction being generated based on a first instruction set of the at least two instruction sets as the test program is executed; stopping, by the processor, the execution of the test program when the exception-causing instruction is executed during the execution of the test program; performing, by the processor, a fixed instruction sequence included in the exception handler when the exception-causing instruction is executed during the execution of the test program; and resuming the test program from a second instruction after the fixed instruction sequence is performed, the second instruction corresponding to an address adjacent to an address of the exception-causing instruction, and the second instruction is generated depending on a second instruction set of the at least two instruction sets.

At least one example embodiment provides that the generating a test program includes reading a first instruction statement included in the test template; generating the first instruction corresponding to the first instruction statement based on the first instruction set; reading a state modifying instruction statement included in the test template; generating the exception-causing instruction, the exception-causing instruction including a switch intention, the switch intention indicating an instruction set corresponding to the state modifying instruction statement; reading a second instruction statement next to the state modifying instruction statement; and generating the second instruction corresponding to the second instruction statement based on the second instruction set at an address adjacent to an address of the exception-causing instruction.

At least one example embodiment provides that the state modifying instruction statement includes the switch intention.

At least one example embodiment provides that the switch intention is detected using a first sub-component of the test generator.

At least one example embodiment provides that content of the first instruction and content of the second instruction are detected by a second sub-component of the test generator.

At least one example embodiment provides that the switch intention about an instruction set is detected using arguments included in the exception-causing instruction.

At least one example embodiment provides that the method further includes obtaining a modeling result by feeding at least one of the first instruction, the second instruction, and the exception-causing instruction to a reference model; and the modeling result includes information about a state change of a verification target processor when the at least one of the first instruction, the second instruction, and the exception-causing instruction is executed.

At least one example embodiment provides that the obtaining the modeling result includes detecting a switch intention about a processor included in the exception-causing instruction when the verification target processor includes at least two processor cores; and feeding a no operation instruction to the reference model without feeding the exception-causing instruction when the switch intention about the processor is detected, and the no operation instruction is used to set a location of a next instruction to be generated without a state change of the reference model.

At least one example embodiment provides that the generated test program is made on a host system on chip that does not include the verification target processor, and the executing a first instruction, the performing and/or executing the fixed instruction sequence, and the resuming the test program are done on a system on chip that includes the verification target processor.

At least one example embodiment relates to a verification method of a system on chip, the system on chip including a processor and supports at least two privilege levels.

According to an example embodiment a verification method of a system on chip, which includes a processor and supports at least two privilege levels, includes receiving, by the processor, a test generator and an exception handler; generating, by the processor including the test generator, a test program including an exception-causing instruction based on a test template; executing, by the processor, a first instruction at a first privilege level of the at least two privilege levels as the test program is executed; stopping, by the processor, the execution of the test program when the exception-causing instruction is executed during the execution of the test program; performing, by the processor, a fixed instruction sequence included in the exception handler when the exception-causing instruction is executed during the execution of the test program; and resuming the test program from a second instruction after the fixed instruction sequence is performed, the second instruction corresponding to an address adjacent to an address of the exception-causing instruction and the second instruction is executed at a second privilege level of the at least two privilege levels.

At least one example embodiment provides that the generating a test program includes reading a first instruction statement included in the test template; generating the first instruction, the first instruction corresponding to the first instruction statement such that the first instruction is performed at the first privilege level; reading a state modifying instruction statement included in the test template; generating the exception-causing instruction including a switch intention about a privilege level, the switch intention about the privilege level indicating to switch from the first privilege level to the second privilege level, the switch intention about the privilege level corresponding to the state modifying instruction statement; reading a second instruction statement next to the state modifying instruction statement in the test template; and generating the second instruction, the second instruction corresponding to the second instruction statement such that the second instruction is performed at the second privilege level at an address adjacent to an address of the exception-causing instruction.

At least one example embodiment provides that the performing a fixed instruction sequence includes storing first state information of the system on chip when the system on chip operates at the first privilege level; and restoring second state information of the system on chip when the system of chip operates at the second privilege level during the execution of the fixed instruction sequence.

At least one example embodiment provides that the first state information and the second state information are stored at a first area of a memory device connected to the system on chip, the first area is assigned to store the first state information and the second state information at the first privilege level.

At least one example embodiment provides that the first state information and the second state information are stored at a second area of a memory device connected to the system on chip, the second area is assigned to store the first state information and the second state information at the second privilege level.

At least one example embodiment relates to a verification method of a system on chip, where the system on chip includes at least two processors.

According to an example embodiment, a verification method of a system on chip, which includes at least two processors, includes receiving, by a first processor of the at least two processors, a test generator and an exception handler; generating, by the first processor including the test generator, a test program including an exception-causing instruction based on a test template; executing, by the first processor, a first instruction as the test program is executed; stopping, by the first processor, the execution of the test program when the exception-causing instruction is executed during the execution of the test program; performing, by the first processor, a fixed instruction sequence included in the exception handler when the exception-causing instruction is executed during the execution of the test program; and resuming, by a second processor of the at least two processors, the test program from a second instruction after the fixed instruction sequence is performed, the second instruction corresponding to an address adjacent to an address of the exception-causing instruction.

At least one example embodiment provides that the generating the test program includes reading a first instruction statement included in the test template; generating the first instruction corresponding to the first instruction statement such that the first instruction is performed at the first processor; reading a state modifying instruction statement included in the test template; generating the exception-causing instruction including a switch intention about a processor, the switch intention about the processor indicating to switch processing of the instruction set from the first processor to the second processor, corresponding to the state modifying instruction statement; reading a second instruction statement next to the state modifying instruction statement; and generating the second instruction corresponding to the at least a second instruction statement such that the second instruction is performed at the second processor at an address adjacent to an address of the exception-causing instruction.

At least one example embodiment provides that the executing a fixed instruction sequence includes storing a first context corresponding to the first processor; and restoring the first context at the second processor before the second instruction is executed, and the exception-causing instruction is executed on the first processor.

At least one example embodiment provides that the method further includes mapping a first virtual processor ID onto a first physical processor ID before the first instruction is executed; and mapping the first virtual processor ID onto a second physical processor ID while the fixed instruction sequence is executed, and the first instruction and the second instruction are executed on the basis of the first virtual processor ID.

At least one example embodiment provides that the executing the fixed instruction sequence includes storing a first context corresponding to the first processor; sending a first interrupt from the first processor to the second processor; storing a second context corresponding to the second processor in response to the first interrupt; sending a second interrupt from the second processor to the first processor; restoring the second context at the first processor in response to the second interrupt; and restoring the first context at the second processor, and the exception-causing instruction is executed at the first processor.

At least one example embodiment provides that the method further includes mapping a first virtual processor ID and a second virtual processor ID onto a first physical processor ID and a second physical processor ID, respectively, before the test program is executed; mapping the first virtual processor ID onto the second physical processor ID while the fixed instruction sequence is executed; and mapping the second virtual processor ID onto the first physical processor ID while the fixed instruction sequence is executed, and the first instruction and the second instruction are executed on a basis of the first virtual processor ID.

At least one example embodiment relates to a computing system.

According to an example embodiment, a computing system includes a memory device configured to store first data, a test generator, and an exception handler for generation of a test program. The computing system includes at least two processors, each of the at least two processors are configured to generate the test program using the first data and the test generator. When the test program is generated, the test generator is configured to generate second data if a switch intention about a processor is detected from the first data. When the test program is executed, a first processor of the at least two processors stops executing the test program according to the second data and the first processor including the exception handler executes a fixed instruction sequence according to the second data such that the test program is resumed after a switch between the first processor and a second processor of the at least two processors is made.

At least one example embodiment relates to a method of generating a test program for verifying a system on chip.

According to an example embodiment a method of generating a test program for verifying a system on chip, where the system on chip including a processor, includes reading, by the processor, an instruction statement included in a test template; determining, by the processor, whether a special condition is included in the instruction statement; generating, by the processor, an instruction corresponding to the instruction statement if the determining determines that the special condition is not included in the instruction statement; providing, by the processor, the generated instruction to a reference model; generating, by the processor, an exception-causing instruction corresponding to the instruction statement if the determining determines that the special condition is included in the instruction statement; providing, by the processor, the generated exception-causing instruction to the reference model obtaining, by the processor, a changed state of the reference model; generating, by the processor, a next instruction based on the changed state of the reference model; and generating, by the processor, the test program including the instruction, the exception-causing instruction, and the next instruction.

At least one example embodiment provides that the generating the exception causing instruction includes determining whether a switch intention exists, the switch intention indicating that the processor is to switch one of a state of an instruction set, a privilege level of the instruction set, and a processor for processing the instruction set; and when the determining determines that the switch intention exists, determining whether the switch intention is one of a switch intention about the instruction set, a switch intention about the privilege level, and a switch intention about the processor.

At least one example embodiment provides that the generating the exception causing instruction further includes providing a no-operation-instruction to the reference model when the switch intention is the switch intention about the processor, the no-operation-instruction indicating to generate the next instruction without changing an operation state of the system on chip.

At least one example embodiment provides that the generating the exception causing instruction further includes providing an exception-causing instruction to the reference model when the switch intention is one of the switch intention about the instruction set and the switch intention about the privilege level; and providing a return address to the reference model, the return address being an address next to an address of the exception-causing instruction.

At least one example embodiment provides that the method further includes providing the generated test program to another system on chip, and the other system on chip executes the generated test program in order to verify the other system on chip.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 8 is a diagram schematically illustrating a mapping table shown in FIG. 4 according to an example embodiment of the inventive concepts;

FIG. 17 is a flow chart showing a test program generation method of a host system on chip shown in FIG. 16 according to an example embodiment of the inventive concepts.

DETAILED DESCRIPTION

Figure 1:
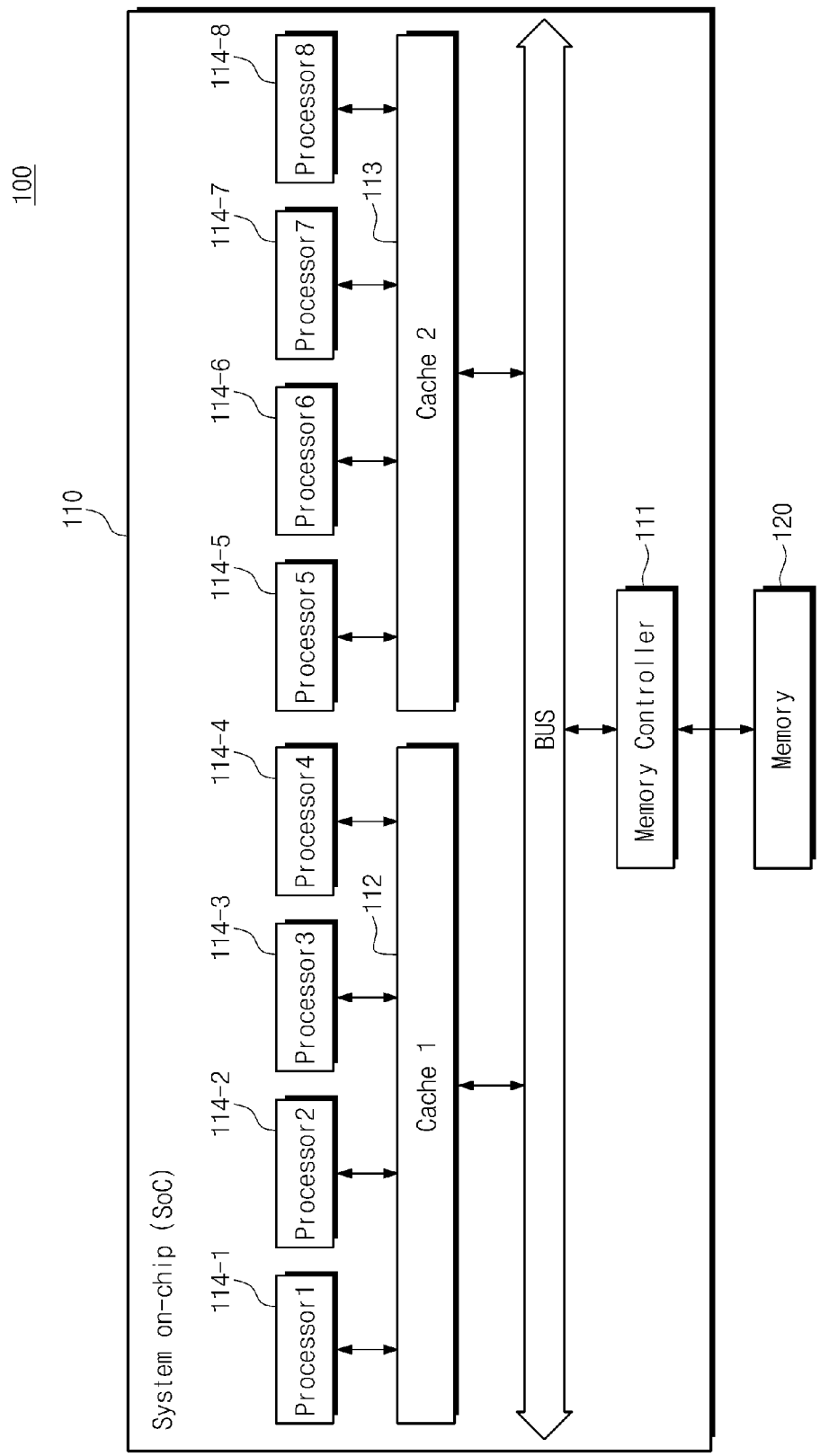
FIG. 1 is a block diagram schematically illustrating a system on chip according to an example embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a system on chip (SoC) will be exemplified as an example of an electronic device to describe the aspects and functions of the inventive concepts. However, the inventive concepts are not limited thereto. Also, the inventive concepts may be implemented with any other embodiments.

FIG. 1 is a block diagram schematically illustrating a system on chip according to an embodiment of the inventive concepts. Referring to FIG. 1, a computing device 100 contains a system on chip (SoC) 110 and a memory device 120.

The SoC 110 contains a memory controller 111. The memory controller 111 provides an interface with the memory device 120. The SoC 110 stores data at the memory device 120 through the memory controller 111 and/or reads data from the memory device 120 through the memory controller 111.

The SoC 110 includes first and second caches 112 and 113. However, the inventive concepts are not limited thereto. For example, the SoC 110 may include a plurality of cache memories. The first and second cache memories 112 and 113 are connected to the memory controller 111 through a system bus. The first and second cache memories 112 and 113 temporarily store data to be used in processors 114-1 through 114-8. The first and second cache memories 112 and 113 may be implemented with, but not limited to, a DRAM, a mobile DRAM, an SRAM, and/or any other like nonvolatile memory device.

The SoC 110 contains the first through eighth processors 114-1 through 114-8. However, the inventive concepts are not limited thereto. The SoC 110 may include more processors than are shown in FIG. 1 or fewer processors than are shown in FIG. 1. For example, each of the first through eighth processors 114-1 through 114-8 may be a central processing unit (CPU), a multi-core processor, a many-core processor, a digital signal processor (DSP), and/or any other like processor. The first through eighth processors 114-1 through 114-8 may have the same function and performance as each other. Alternatively, the first through eighth processors 114-1 through 114-8 may have different functions and performance than one or more other ones of the first through eighth processors 114-1 through 114-8. For example, in various embodiments, one or more of the first through eighth processors 114-1 through 114-8 may include a little core and a big core. In various embodiments, one or more of the first through eighth processors 114-1 through 114-8 may be a little core. In various embodiments, one or more of the first through eighth processors 114-1 through 114-8 may be a big core. The term "core" and/or "processing core" may refer to an independent processing device that reads and executes program code and/or software modules. In a multi-core processor, each core may execute and/or run program code at the same time thereby increasing a processing speed of the multi-core processor. The term "big core" and "little core" may refer to a size, processing speed, and/or power consumption associated with a core. For instance, a big core may be a processor that consumes a relatively large amount of power when compared to a little core but has a faster processing speed than a little core. A little core may be a processor that has a relatively slow processing speed compared to a big core but consumes less power than a big core. In various embodiments, the big core may be used to process and/or execute relatively intensive tasks (e.g., three dimensional (3D) graphics, etc.), while the little core may be used to process and/or execute less intensive tasks (e.g., mobile phone-related functions etc.). It should be noted that the first through eighth processors 114-1 through 114-8 are not limited to the aforementioned disclosure, and the first through eighth processors 114-1 through 114-8 may include any type of computer processing device.

In FIG. 1, an example embodiment of the inventive concepts is exemplified as the first through fourth processors 114-1 through 114-4 are connected to the first cache memory 112 and the fifth through eighth processors 114-5 through 114-8 are connected to the second cache memory 113.

Information such as instructions, program code, software modules, data, and/or control signals are exchanged through the system bus among the first through eighth processors 114-1 through 114-8. The information is exchanged through the system bus between the memory controller 111 and each of the processors 114-1 through 114-8.

The memory device 120 stores data received from the memory controller 111. According to various embodiments, the memory device 120 stores programs and data for verifying the SoC 110 of the inventive concepts.

Figure 2:
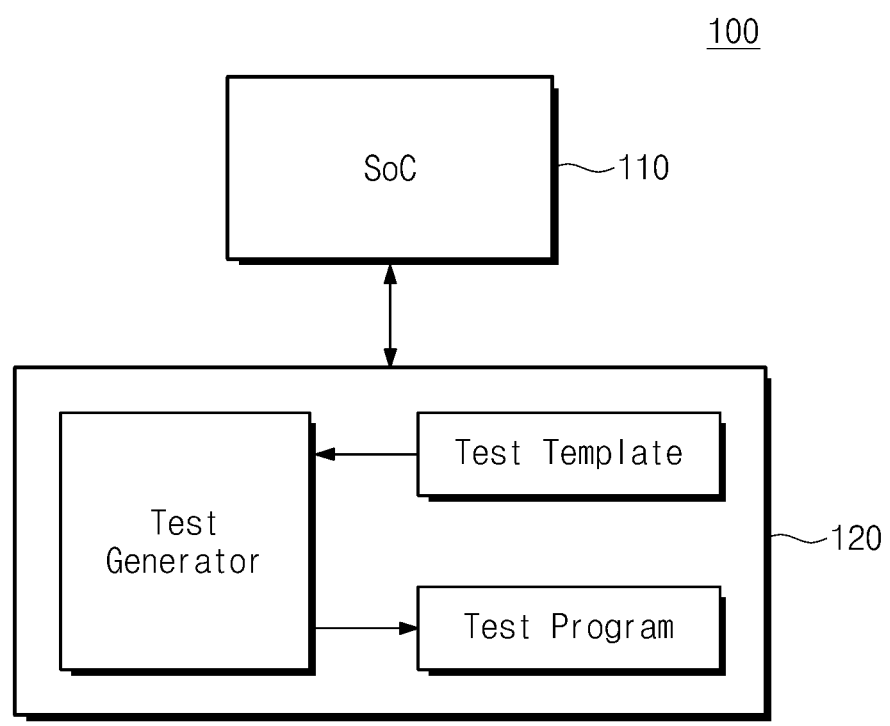
FIG. 2 is a block diagram schematically illustrating a configuration for verifying a system on chip shown in FIG. 1 by means of an in-situ verification according to an example embodiment of the inventive concepts.

FIG. 2 is a block diagram schematically illustrating a configuration for verifying a system on chip shown in FIG. 1 by means of an in-situ verification according to an example embodiment of the inventive concepts. Referring to FIG. 2, a memory device 120 receives and stores a test template and a test generator. In various embodiments, the SoC 110 produces a test program using the test template and the test generator. In such embodiments, program code and/or software modules of the test generator may be loaded into a processor of the SoC 110 from the memory device 120 in order to produce the test program. Once program code and/or software modules for the test generator are loaded into a processor of the SoC 110, the processor of the SoC 110 is programmed to perform the various operations and functions delineated by the program code of the test generator, thereby transforming the processor of the SoC 110 into special purpose processor. The SoC 110 performs an in-situ verification operation using the test program.

During the in-situ verification operation, the test template and the test generator are stored in the memory device 120 that is connected to the SoC 110 to be verified. The test generator may be a type of program, program code, and/or software module. Once the program code and/or software modules are loaded into a processor of the SoC 110, the processor including the test generator may automatically generate the test program using the test template. The test program includes at least one instruction to be executed by the SoC 110. For example, the at least one instruction may be formed of a random instruction sequence.

The test generator reads an instruction statement in the test template and produces an instruction of the test program based on the read instruction statement. For example, the test generator reads one instruction statement to generate one instruction. Also, the test generator may read a plurality of instruction statements to generate one instruction. The test generator may read one instruction statement to generate a plurality of instructions.

The test program is executed on the SoC 110. The SoC 110 executes the test program to verify a performance of the SoC 110.

Figure 3:
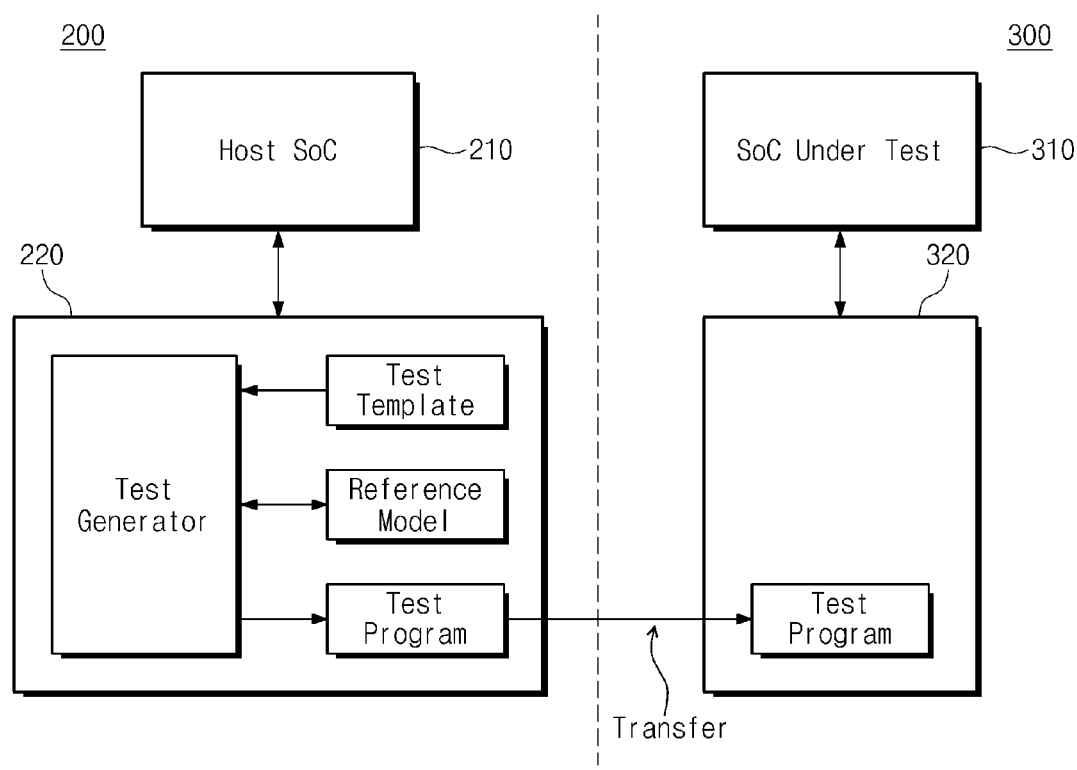
FIG. 3 is a block diagram schematically illustrating a configuration for verifying a system on chip shown in FIG. 1 by means of an ex-situ verification manner using a reference model according to an example embodiment of the inventive concepts.

FIG. 3 is a block diagram schematically illustrating a configuration for verifying a system on chip shown in FIG. 1 by means of an ex-situ verification manner using a reference model according to an example embodiment of the inventive concepts. Referring to FIG. 3, a host computing device 200 produces a test program and transfers it to a computing device 300 to be verified. The host computing device 200 contains a host system on chip (SoC) 210 and a host memory device 220. The computing device 300 to be verified contains a system on chip (SoC) 310 to be verified and a memory device 320 to be verified. The host SoC 210 and the SoC 310 to be verified may the same or similar configuration as the SoC 110 shown in FIG.

During operation, the host memory device 220 receives and stores a test template, a reference model, and a test generator. The reference model and the test generator may be programs. The test generator automatically generates a test program using the test template. An instruction that is produced when the test program is generated is fed back into the reference model. The reference model may be configured according to a processor included in the SoC 310 to be verified. For example, the reference model may be software that is obtained by modeling a processor included in the SoC 310 to be verified. The reference model provides information about a status change of a processor included in the SoC 310 to be verified when each instruction of the test program is executed. That is, the reference model outputs a modeling result that is obtained by tracing a status change of a processor included in the SoC 310 to be verified in response to the fed instruction. The reference model provides the test generator with the modeling result based on the fed instruction. The test generator generates a next instruction, based on the modeling result transferred from the reference model. The test program that is generated is provided to the computing device 300 to be verified.

The test program may be stored in a memory device 320 of the computing device 300 to be verified. The test program is executed on the SoC 310 to be verified. The SoC 310 to be verified performs a verification operation using the test program.

Figure 4:
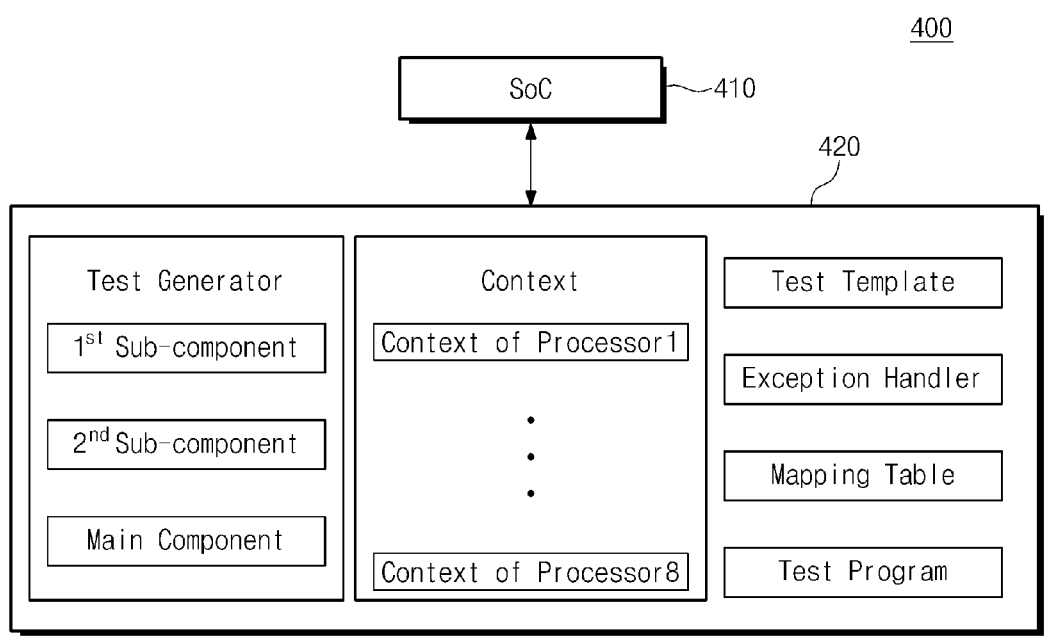
FIG. 4 is a block diagram schematically illustrating a configuration for verifying a system on chip, according to an example embodiment of the inventive concepts.

FIG. 4 is a block diagram schematically illustrating a configuration for verifying a system on chip, according to an example embodiment of the inventive concepts. Referring to FIG. 4, a computing device 400 performs an in-situ verification method. A processor included in the system on chip (SoC) 410 contains the same or similar configuration as a SoC 110 shown in FIG. 1. The processor included in the SoC 410 may include a plurality of processors. Also, each processor supports a plurality of privilege levels.

When a test program is generated, a memory device 420 connected to the SoC 410 stores a test generator and a test template. The processor included in the SoC 410 executes the test generator to generate a test program. The test generator may be a type of program and/or software module. The test generator reads an instruction statement in the test template to generate an instruction of the test program. For example, the test generator reads one instruction statement to generate one instruction. Also, the test generator may read a plurality of instruction statements to generate one instruction. The test generator may also read one instruction statement to generate a plurality of instructions.

While the test generator reads a template statement, a first ($1^{st}$) sub-component included in the test generator detects a switch intention about an instruction set, a privilege level, and/or a processor. A state of the instruction set, the privilege level, and/or the processor is referred to as an operating state for operating the SoC 410. When a switch intention of the operating state is detected, the test generator generates an exception-causing instruction. The switch intention of on operating state indicates that a state of operation of the SoC 410 should change.

The switch intention of the operating state may be expressed by a variety of methods. For example, the switch intention of the operating state may be expressed by contents of a template statement. In various embodiments, the switch intention of the operating state may be expressed by a template statement that generates an exception-causing instruction with a specific binary code value. Also, the switch intention of the operating state may be expressed using a template statement that generates two instructions: a command for assigning a specific value to a register and a system call command. However, expression about the switch intention of the operating state may not be limited thereto. An instruction statement including the switch intention of the operating state is referred to as a state modifying statement.

A second ($2^{nd}$) sub-component included in the test generator determines content of an instruction corresponding to a template statement while the test generator reads the template statement. For example, the second ($2^{nd}$) sub-component selects a instruction set corresponding to the template statement. The test generator generates a new instruction from the selected instruction set.

A main component included in the test generator controls an overall operation of the test generator. The main component sequentially reads template statements from the test template one statement at a time (or alternatively "one by one"). The main component generates an instruction of the test program, depending on information decided by the first ($1^{st}$) sub-component and the second ($2^{nd}$) sub-component.

During a verification operation, the processor included in the SoC 410 executes the test program generated. The processor included in the SoC 410 executes instructions included in the test program sequentially. When an exception-causing instruction is detected during execution of the test program, the processor included in the SoC 410 stops executing the test program and executes the exception handler. The exception handler may be stored in the memory device 420 connected to the SoC 410. The exception handler may be formed of a program, program code, and/or a software module. Once program code and/or software modules for the exception handler are loaded into a processor of the SoC 410, the processor of the SoC 410 is programmed to perform the various operations and functions delineated by the program code of the exception handler, thereby transforming the processor of the SoC 410 into special purpose processor. For example, the processor including the exception handler may check a binary code of the exception-causing instruction. Alternatively or in addition, the processor including the exception handler checks arguments stored in a register. Thus, the processor including the exception handler checks a switch intention of an instruction set, a privilege level, and/or a processor by means of the binary code and/or the arguments stored in the register. The exception handler contains a fixed instruction sequence. At this time, when a result of checking the binary code or the arguments stored in the register indicates a switch of the instruction set, the privilege level, and/or the processor, the processor included in the SoC 410 sequentially executes the fixed instruction sequence. One instruction of the fixed instruction sequence may include content indicating a return to an address just next to an address of the exception-causing instruction after an exception process is ended. Thus, the processor included in the SoC 410 stops executing the exception handler and resumes the test program. When the test program is resumed, the processor included in the SoC 410 executes the test program with the modified instruction set and/or the modified privilege level. Also, the test program may be run on a modified processor.

As the test program is executed, the processor included in the SoC 410 stores the context at the memory device 420 or restores it from the memory device 420. The processor included in the SoC 410 stores the context when execution of the test program is stopped. Also, the processor included in the SoC 410 restores the context when the test program is resumed. The context may mean information needed to resume the test program after execution of the test program is stopped. That is, the context means a state of the processor included in the SoC 410 just before the test program is stopped. For example, the context may include register information of each processor. If each processor of the SoC 410 supports six privilege levels, the context of each processor may include contexts corresponding to first through six levels.

A mapping table is stored in the memory device 420 connected to the SoC 410. The mapping table is used to generate the test program regardless of a processor switchover. The mapping table stores mapping information between a physical ID and a virtual ID of a processor. Instructions of the test program may be executed depending on a fixed processor ID. For example, an instruction of the test program may be produced depending on a virtual ID. An effect of an actual processor switchover is obtained through modification of the mapping table.

Figure 5:
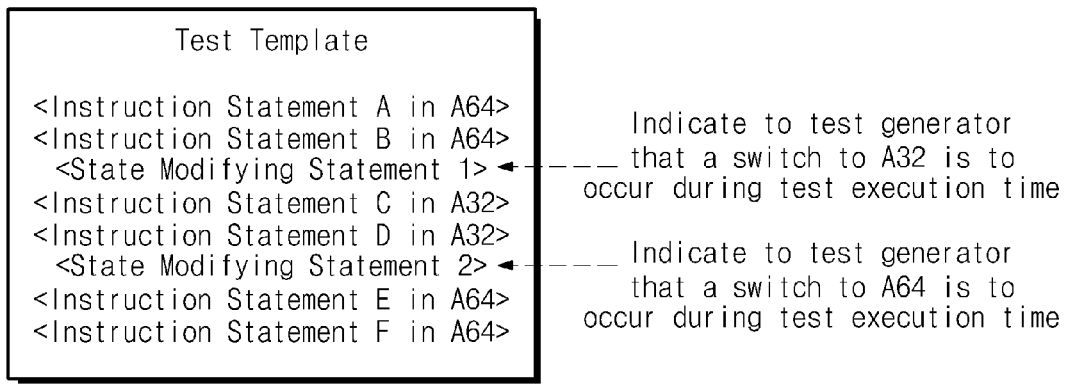
FIGS. 5 through 7 are diagrams schematically illustrating a test template shown in FIG. 4, according to an example embodiment of the inventive concepts.
Figure 6:
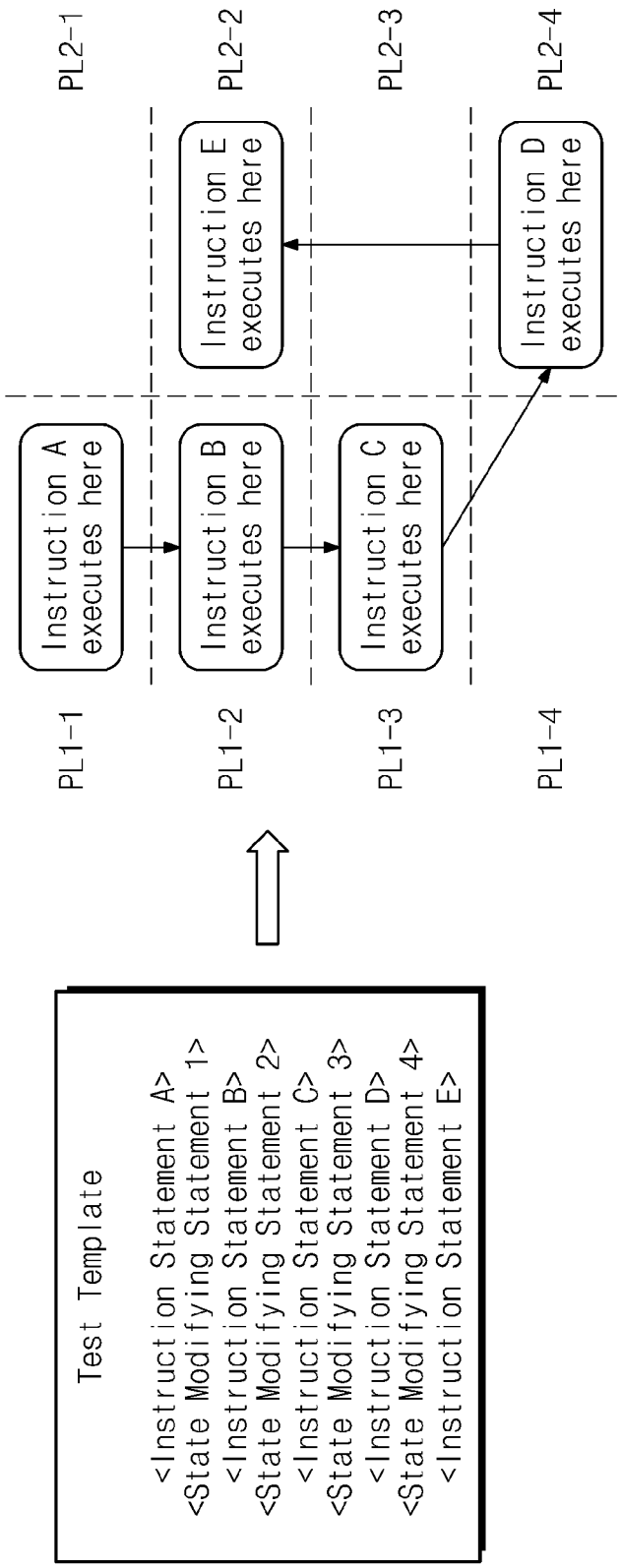
Figure 7:
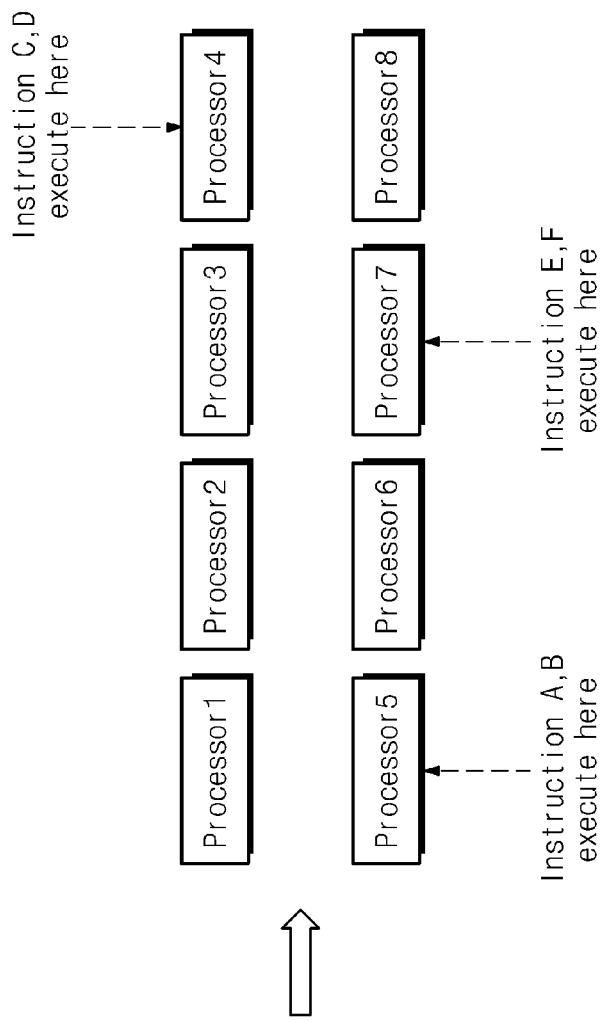

FIGS. 5 through 7 are diagrams schematically illustrating a test template shown in FIG. 4, according to an example embodiment of the inventive concepts. FIG. 5 is a diagram showing a test template accompanying a switchover of an instruction set, according to an embodiment of the inventive concepts. Referring to FIG. 5, a test template includes a plurality of template statements. As shown, the test template contains instruction statements A through F corresponding to different instruction sets A32 and A64. Also, the test template contains a state modifying statement 1 and a state modifying statement 2. In various embodiments, both the state modifying statement 1 and the state modifying statement 2 may include a switch intention about the instruction set, which indicates that a state of the instruction set to be processed should be changed.

A processor included in a SoC 410 executes a test generator to generate a test program. The test generator sequentially reads the template statements included in the test template one statement at a time (or alternatively "one by one"). The test generator generates a 64-bit instruction A64 corresponding to each of instruction statements A and B.

The test generator generates an instruction for switching over an instruction set corresponding to the state modifying statement 1. For example, when detecting the state modifying statement 1, the test generator generates an exception-causing instruction. The exception-causing instruction includes arguments for changing an instruction set into 32 bits.

After generating the exception-causing instruction in compliance with the state modifying statement 1, the test generator generates a 32-bit instruction A32 corresponding to each of the instruction statement C and the instruction statement D.

The test generator generates an instruction for changing an instruction set corresponding to the state modifying statement 2. For example, when detecting the state modifying statement 2, the test generator makes or otherwise generates the exception-causing instruction. The exception-causing instruction may include arguments for changing an instruction set into 64 bits.

After generating the exception-causing instruction in compliance with the state modifying statement 2, the test generator generates a 64-bit instruction A64 corresponding to each of the instruction statement E and the instruction statement F.

As described above, the SoC 410 of the inventive concepts produces the test program for changing an instruction set by way of the state modifying statement 1 and the state modifying statement 2.

FIG. 6 is a diagram showing a test template accompanying a switchover of a privilege level, according to an example embodiment of the inventive concepts. Referring to FIG. 6, a test template includes a plurality of template statements. For example, the test template contains instruction statements A through E having different privilege levels. Also, the test template contains a state modifying statement 1 through a state modifying statement 4.

A processor of the SoC 410 including the test generator sequentially reads template statements included in the test template one statement at a time (or alternatively "one by one"). The test generator generates an instruction A corresponding to the instruction statement A. The instruction A is an instruction that is executed at a privilege level PL1-1 during a verification operation.

The test generator makes or otherwise generates an instruction for changing a privilege level corresponding to the state modifying statement 1. For example, when detecting the state modifying statement 1, the test generator generates an exception-causing instruction. The exception-causing instruction includes arguments for changing and/or setting a privilege level to be a privilege level PL1-2.

After generating the exception-causing instruction in compliance with the state modifying statement 1, the test generator generates an instruction B corresponding to the instruction statement B. The instruction B is an instruction that is executed at a privilege level PL1-2 during a verification operation.

The test generator generates an instruction for changing an instruction set corresponding to the state modifying statement 2. For example, when detecting the state modifying statement 2, the test generator makes or otherwise generates the exception-causing instruction. The exception-causing instruction may include arguments for changing and/or setting a privilege level to be a privilege level PL1-3.

The exception-causing instruction may be produced in compliance with the state modifying statement 3 and the state modifying statement 4 as described above, and a detailed description thereof is thus omitted. The exception-causing instruction may include arguments for expressing a switch intention of a privilege level. Thus, the instructions C through E may be executed at a changed privilege level.

In FIG. 6, a processor included in the SoC 410 supports eight privilege levels PL1-1 through PL1-4 and PL2-1 through PL2-4. In various embodiments, the privilege levels PL1-1 through PL1-4 may be non-secure levels, while the privilege levels PL2-1 through PL2-4 may be secure levels. However, the one or more processor included in the SoC 410 may not be limited thereto. The processor include in the SoC 410 may support at least one privilege level.

As described above, the SoC 410 of the inventive concepts may produce the test program that changes a privilege level by way of the state modifying statement 1 through the state modifying statement 4.

FIG. 7 is a diagram showing a test template accompanying a switchover of a processor. Referring to FIG. 7, a test template includes a plurality of template statements. As shown, the test template contains instruction statements A through F corresponding to different processors. Also, the test template contains a state modifying statement 1 and a state modifying statement 2.

A processor included in a SoC 410 executes a test generator to generate a test program. The test generator sequentially reads the template statements included in the test template one statement at a time (or alternatively "one by one"). The test generator generates instructions A and B corresponding to instruction statements A and B. The instructions A and B may be instructions that are executed on a fifth processor during a verification operation.

The test generator generates an instruction for changing a processor corresponding to a state modifying statement 1. For example, when detecting the state modifying statement 1, the test generator makes or otherwise generates an exception-causing instruction. The exception-causing instruction includes arguments for changing a processor into a fourth processor, or switching from the fifth processor to the fourth processor.

After generating the exception-causing instruction in compliance with the state modifying statement 1, the test generator generates instructions C and D corresponding to the instruction statements C and D. The instructions C and D may be commands that are executed on the fourth processor during a verification operation.

The test generator generates an instruction for changing a processor corresponding to a state modifying statement 2. For example, when detecting the state modifying statement 2, the test generator makes or otherwise generates the exception-causing instruction. The exception-causing instruction includes arguments for changing a processor into a seventh processor.

After generating the exception-causing instruction in compliance with the state modifying statement 2, the test generator generates instructions E and F corresponding to the instruction statements E and F. The instructions E and F may be commands that are executed on the seventh processor during a verification operation.

As described above, the processor included in the SoC 410 of the inventive concepts produces the test program for changing a processor by means of the state modifying statement 1 and the state modifying statement 2.

FIG. 8 is a diagram schematically illustrating a mapping table shown in FIG. 4 according to an example embodiment of the inventive concepts. Referring to FIG. 8, a mapping table shows a relationship between physical processor IDs and virtual processor IDs.

As described with reference to FIG. 7, a test generator reads a test template to generate a test program including instructions to be executed by different processors. However, instructions of the test program may be generated by a designated processor. Thus, instructions of the test program may be generated depending on a virtual processor ID. If a relationship between a virtual processor ID and a physical processor ID is changed, the test program may change processors for performing an operation.

The processors 1 through 8 have fixed physical processor IDs. The virtual processor IDs and the physical processor IDs are mapped in one-to-one correspondence. However, the inventive concepts are not limited thereto. For example, a virtual processor ID of '1' is mapped onto a physical processor ID of '3', a virtual processor ID of '2' onto a physical processor ID of '8', and a virtual processor ID of '3' onto a physical processor ID of T. Also, a virtual processor ID of '4' is mapped onto a physical processor ID of '6', a virtual processor ID of '5' onto a physical processor ID of '7', and a virtual processor ID of '6' onto a physical processor ID of '2'. A virtual processor ID of '7' is mapped onto a physical processor ID of '4' and a virtual processor ID of '8' onto a physical processor ID of '5'. The physical processor ID of '5' may be undefined during processor migration.

Also, the virtual processor ID may be changed with a processor migration and/or swap operation. For example, the virtual processor ID may be changed at the processor migration operation. At least one virtual processor ID that is undefined may exist at the processor migration operation. The virtual processor ID of '1' is mapped onto the physical processor ID of '3' before the processor migration operation. If the processor migration operation is carried out, the virtual processor ID of '1' may be mapped onto the physical processor ID of '5'. Thus, the physical processor ID of '3' may be at an undefined state.

In various embodiments, the virtual processor ID may be changed at the processor swap operation. For example, before the processor swap operation is carried out, the virtual processor IDs of '6' and '4' are mapped onto the physical processor IDs of '2' and '6', respectively. If the processor swap operation is carried out, the virtual processor IDs of '6' and '4' may be mapped onto the physical processor IDs of '6' and '2', respectively.

As described above, the virtual processor ID may be changed to differ from a physical processor ID after the processor migration and/or swap operation. The test program may operation based on the virtual processor ID. If the virtual processor ID is changed, the test program may be executed on a changed processor.

Figure 9:
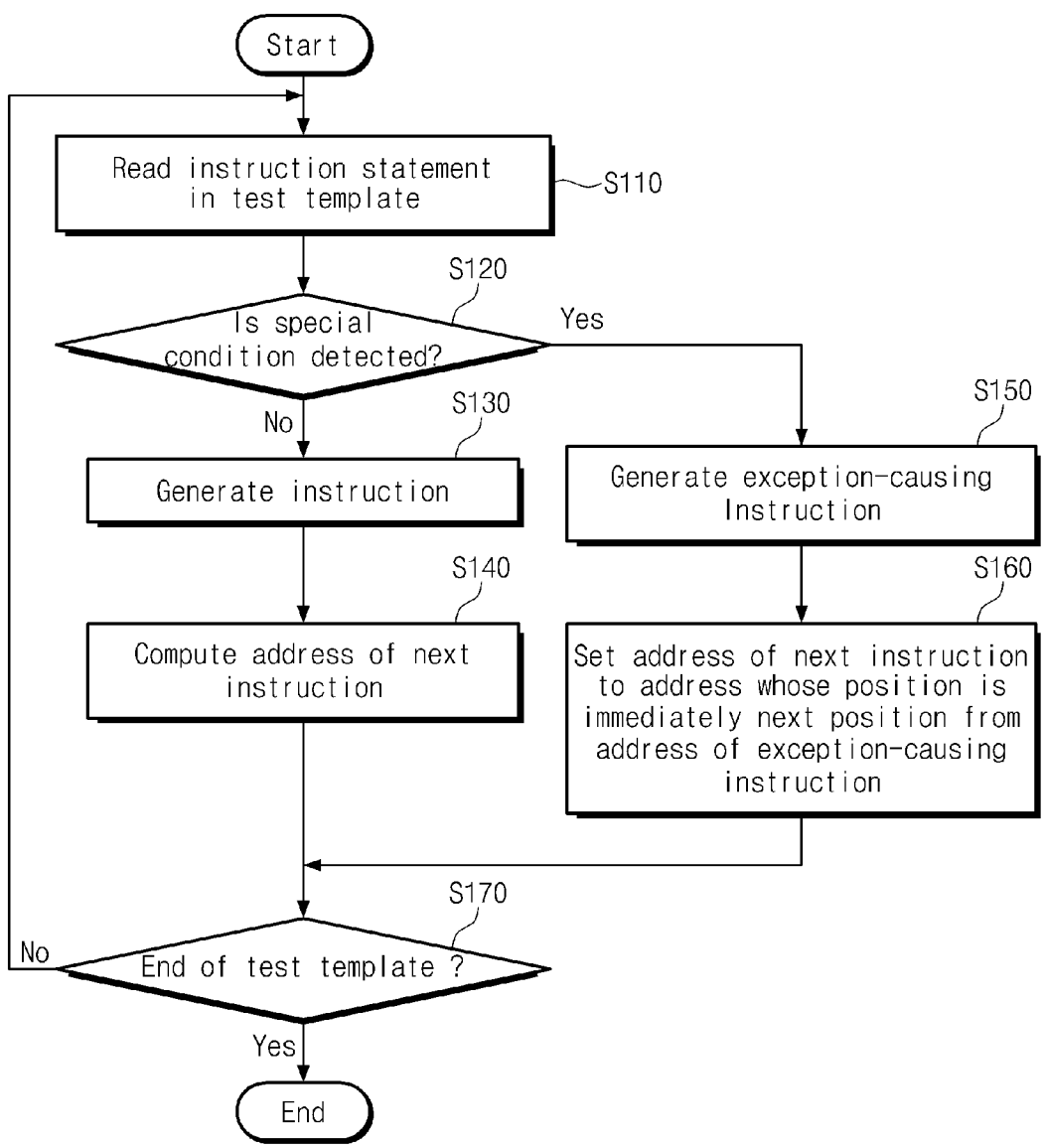
FIG. 9 is a flow chart showing a test program generating method according to an example embodiment of the inventive concepts.

FIG. 9 is a flow chart showing a test program generating method according to an example embodiment of the inventive concepts. The test program generating method of FIG. 9 will be described as being performed by the SoC 410 including the test generator as described with regard to FIG. 4. However, it should be noted that any SoC device that has a same or similar configuration as the SoC 410 may operate the test program generating method. Referring to FIGS. 4 and 9, a processor included in the SoC 410 executes a test generator to generate a test program.

In operation S110, the test generator reads an instruction statement included in a test template.

In operation S120, the test generator detects or otherwise determines whether the instruction statement includes a specific condition based on a first sub-component. For example, the specific condition may be expression about an instruction set, a privilege level, and/or a processor's switch intention. A switch intention about the instruction set, privilege level, and/or a processor may be expressed in a variety of ways. The switch intention about the instruction set, privilege level, and/or processor may be expressed using contents of the template statement. Also, the switch intention about the instruction set, privilege level, and/or processor may be expressed using a template statement that generates an exception-causing instruction with a specific binary code. Also, the switch intention about the instruction set, privilege level, and/or processor may be expressed using a template statement that produces two instructions, for example, an instruction for assigning a specific value to a register and a system call instruction. However, expression about the switch intention of the instruction set, privilege level, and/or processor is not limited thereto.

If the instruction statement does not include a specific condition, the test generator proceeds to operation S130. If the instruction statement includes a specific condition, the test generator proceeds to operation S150 to generate an exception-causing instruction.

In operation S130, the test generator generates an instruction corresponding to the instruction statement.

In operation S140, the test generator calculates an address of a memory for a next instruction. For example, in various embodiments, the test generator calculates an address of a next instruction using a program counter. The program counter informs a location of the memory where the next instruction is to be stored.

In operation S150, the test generator generates an exception-causing instruction. For example, a first sub-component included in the test generator detects a switch intention about an instruction set, a privilege level, and/or a processor while the test generator reads the template statement. The exception-causing instruction may include a switch intention about an instruction set, a privilege level, and/or a processor to be used.

In operation S160, the test generator sets an address of a next instruction. An address of the next instruction may be set to an address of a memory that is adjacent next to the address of the exception-causing instruction. For example, when the size of the exception-causing instruction is four bytes, the test generator may add '4' to a current program counter and set the program counter of the next instruction with the addition result. That is, the next instruction may be stored at an address adjacent next to an address where the exception-causing instruction is stored.

In operation S170, the test generator determines whether the test template includes an instruction statement to be next read. If the test template does not include an instruction statement to be next read, the test generator may end generating the test program. If the test template includes an instruction statement to be next read, the test generator proceeds to operation S110, in which the test generator reads a next instruction statement.

According to the above-described test program generating method, the test generator makes or otherwise generates a test program which includes an exception-causing instruction having a switch intention about an instruction set, privilege level, and/or processor. The processor included in the SoC 410 changes an instruction set, privilege level, and/or processor in compliance with the exception-causing instruction to then perform a verification operation.

Figure 10:
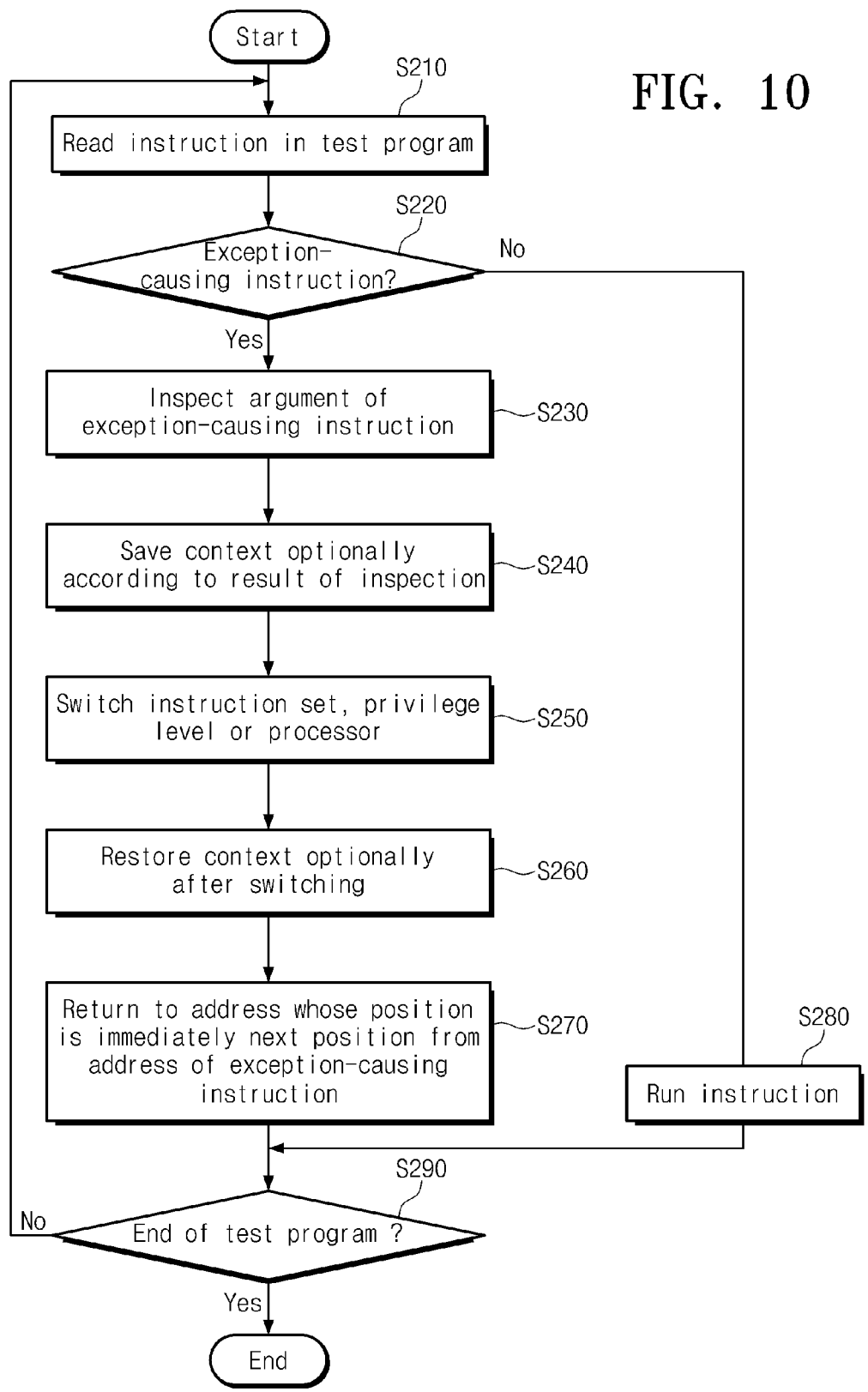
FIG. 10 is a flow chart schematically illustrating an operation of a test program according to an example embodiment of the inventive concepts.

FIG. 10 is a flow chart schematically illustrating an operation of a test program according to an example embodiment of the inventive concepts. The operation of a test program of FIG. 10 will be described as being performed by the SoC 410 as described with regard to FIG. 4. However, it should be noted that any SoC device that has a same or similar configuration as the SoC 410 may operate a test program according to the method shown in FIG. 10. Referring to FIGS. 4 and 10, a processor included in a SoC 410 executes a test program generated in FIG. 9 to carry out a verification operation.

In operation S210, a processor to be verified (hereinafter, referred to as the "verification target processor") reads an instruction included in a test program.

In operation S220, the verification target processor determines whether the read instruction is an exception-causing instruction. If the read instruction is not the exception-causing instruction, the verification target processor proceeds to operation S280, in which the verification target processor executes the instruction read in operation S210. If the read instruction is the exception-causing instruction, the verification target processor proceeds to operation S230 to inspect the arguments of the exception-causing instruction.

For example, in various embodiments, whether the read instruction is the exception-causing instruction may be determined by checking a program counter of the instruction. In such embodiments, the verification target processor determines whether the program counter corresponding to the instruction is within an exception handler. If the program counter corresponding to the instruction is not within the exception handler, the instruction may be determined to be a typical instruction. If the program counter corresponding to the instruction is within the exception handler, the instruction may be determined to be the exception-causing instruction.

In operation S230, the verification target processor inspects arguments included in the exception-causing instruction. If the exception-causing instruction is executed, the verification target processor stops the test program and executes the exception handler. The verification target processor including the exception handler inspects arguments included in the exception-causing instruction. If inspecting the arguments, the verification target processor including the exception handler determines a switch intention about an instruction set, a privilege level, or a processor.

In operation S240, the verification target processor selectively stores contexts depending on the test result about arguments. If a switch intention about an instruction set, a privilege level, or a processor is checked depending on the test result about arguments, the exception handler executes a fixed instruction sequence. The verification target processor selectively stores contexts while the fixed instruction sequence is carried out.

That is, the verification target processor stores state information before an instruction set, a privilege level, and/or a processor is switched. For example, the verification target processor may change a instruction set from 32 bits to 64 bits. The verification target processor switches a privilege level PL1-1 (as discussed with regard to FIG. 6) into a privilege level PL1-2. The verification target processor may be switched into any other processor in the SoC 410. As a result, the test program is resumed on the switched to processor.

In operation S260, the verification target processor selectively restores contexts after an instruction set, a privilege level, and/or a processor is switched. After a processor is switched, the switched to processor may become the verification target processor.

In operation S270, the verification target processor returns to an address adjacent to an address of the exception-causing instruction in the test program. Thus, the verification target processor executes a next instruction of the exception-causing instruction with an instruction set, a privilege level, and/or a processor switched.

In operation S290, the verification target processor determines whether the test program includes a next instruction to be executed. If the test program includes a next instruction to be executed, the method may proceed to operation S210, in which the verification target processor performs operations S210 through S280 iteratively. If the test program does not include a next instruction to be executed, the verification target processor ends the test program.

As described above, the verification target processor changes an instruction set, a privilege level, and/or a processor to execute the test program, thereby making it possible for the verification target processor to perform a verification operation under various environments.

Figure 11:
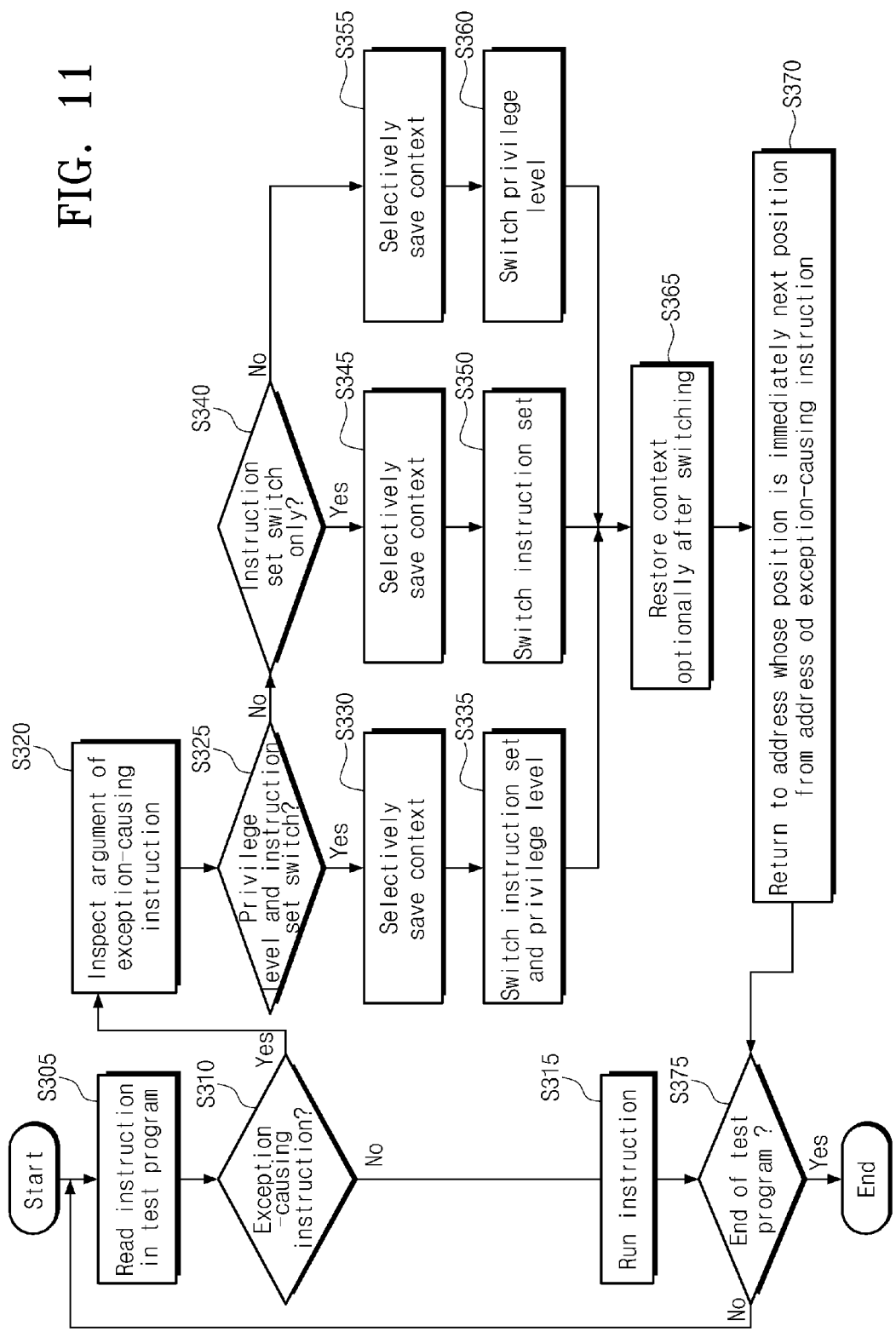
FIG. 11 is a flow chart schematically illustrating execution of a test program including a change in a privilege level and an instruction set, according to an example embodiment of the inventive concepts.

FIG. 11 is a flow chart schematically illustrating execution of a test program including a change in a privilege level and an instruction set, according to an example embodiment of the inventive concepts. The execution of a test program as shown by FIG. 11 will be described as being performed by the SoC 410 as described with regard to FIG. 4. However, it should be noted that any SoC device that has a same or similar configuration as the SoC 410 may execute a test program according to the method shown in FIG. 11. Referring to FIGS. 4 and 11, a verification target processor executes a verification operation by means of a test program generated in FIG. 9.

In operation S305, the verification target processor executes an instruction included in the test program.

In operation S310, the verification target processor determines whether the read instruction is an exception-causing instruction. As a consequence of determining that the read instruction is not the exception-causing instruction, the verification target processor proceeds to operation S315, in which the verification target processor executes the read instruction. As a consequence of determining that the read instruction is the exception-causing instruction, the verification target processor proceeds to operation S320 to inspect the arguments of the exception-causing instruction.

For example, the verification target processor determines whether that the read instruction is the exception-causing instruction based on a result of checking a program counter of the instruction. The verification target processor determines whether a program counter corresponding to the instruction is within an exception handler. When program counter corresponding to the instruction is not within the exception handler, the instruction is determined to be a typical instruction. When program counter corresponding to the instruction is within the exception handler, the instruction is determined to be the exception-causing instruction.

In operation S320, the verification target processor inspects arguments included in the exception-causing instruction. If the exception-causing instruction is executed, the verification target processor stops the test program for a moment (i.e., pauses the test program) and executes the exception handler. The exception handler inspects arguments included in the exception-causing instruction.

In operation S325, the verification target processor including the exception handler checks a switch intention about an instruction set and a privilege level. When an instruction set and a privilege level all are not switched, the verification target processor proceeds to operation S340 to determine whether only the instruction set is switched. When an instruction set and a privilege level all are switched, the verification target processor proceeds to operation S330.

In operation S330, the verification target processor selectively stores contexts depending on the inspection result of the arguments. If the switch intention about the instruction set and the privilege level is identified depending on the inspection result of arguments, the verification target processor including the exception handler performs a fixed instruction sequence. The verification target processor selectively stores contexts corresponding to both the instruction set and the privilege level while the fixed instruction sequence is executed.

In operation S335, the verification target processor switches both the instruction set and the privilege level.

In operation S340, the verification target processor including the exception handler determines whether only the instruction set is switched. If the privilege level is only switched without a switchover of the instruction set, the verification target processor proceeds to operation S355 to optionally save the contexts. If the instruction set is only switched without a switchover of the privilege level, the verification target processor proceeds to operation S345 to selectively store the contexts.

In operation S345, the verification target processor selectively stores contexts depending on the inspection result of the arguments. If the switch intention about the instruction set is identified depending on the inspection result of arguments, the verification target processor including the exception handler performs the fixed instruction sequence. The verification target processor selectively stores contexts corresponding to the instruction set while the fixed instruction sequence is executed.

In operation S350, the verification target processor only switches the instruction set.

In operation S355, the verification target processor selectively stores contexts depending on the inspection result of the arguments. If the switch intention about the privilege level is identified depending on the inspection result of arguments, the verification target processor including the exception handler performs the fixed instruction sequence. The verification target processor stores contexts corresponding to the privilege level while the fixed instruction sequence is executed.

In operation S360, the verification target processor only switches the privilege level.

In operation S365, the exception handler selectively restores contexts after the instruction set or the privilege level is switched.

In operation S370, the verification target processor returns to an address adjacent to an address of the exception-causing instruction in the test program. Thus, the verification target processor executes a next instruction of the exception-causing instruction with the instruction set or the privilege level changed.

In operation S375, the verification target processor determines whether the test program includes a next instruction to be executed. As a consequence of determining that the test program includes a next instruction to be executed, the verification target processor proceeds to step S305 such that the verification target processor repeats steps S305 through S370. As a consequence of determining that the test program does not include a next instruction to be executed, the verification target processor ends the test program.

As described above, the verification target processor simultaneously switches an instruction set and a privilege level and then executes the test program. However, the inventive concepts are not limited thereto. For example, the verification target processor may simultaneously switch an instruction set, a privilege level, and a processor, and then execute the test program.

Figure 12:
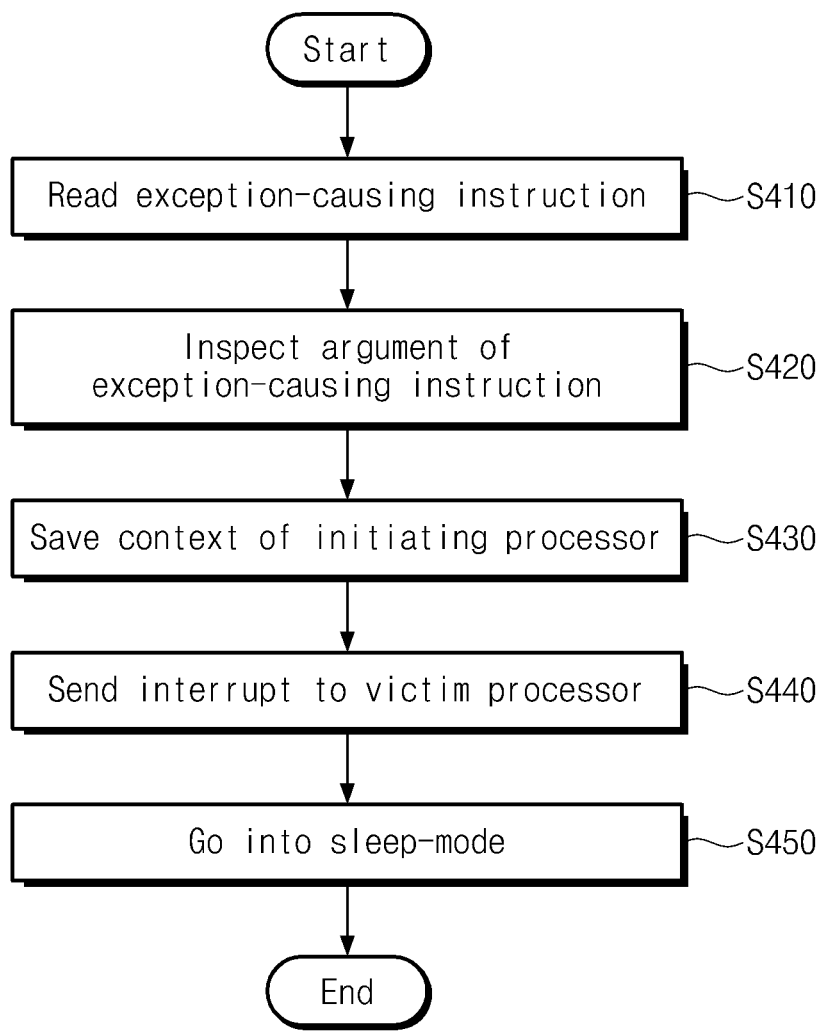
FIG. 12 is a flow chart schematically illustrating an operation of an initiating processor during processor migration according to an example embodiment of the inventive concepts.
Figure 13:
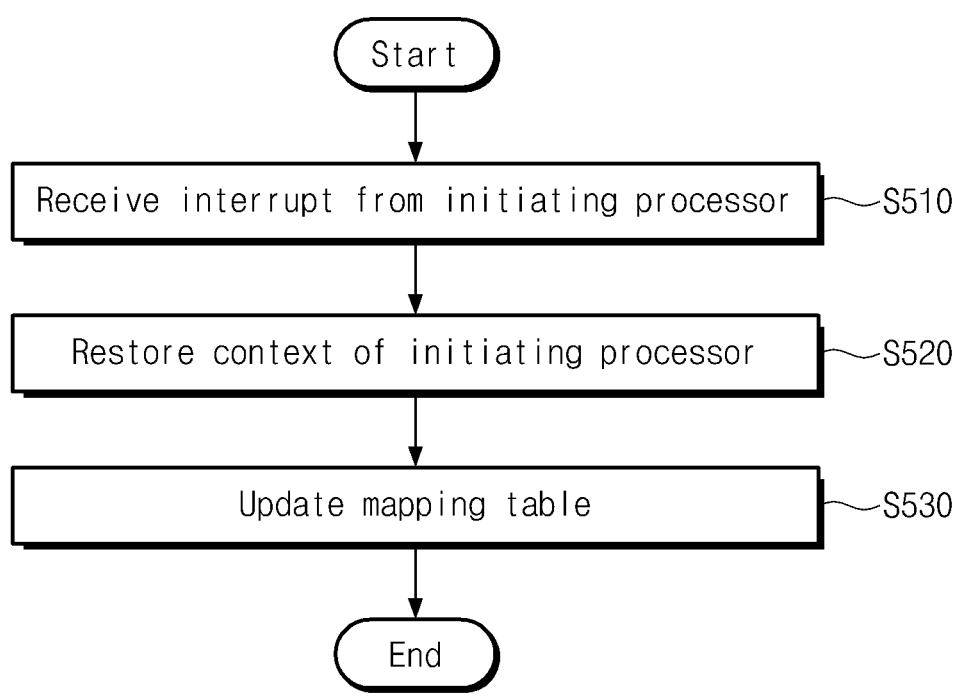
FIG. 13 is a flow chart schematically illustrating an operation of a victim processor during processor migration according to an example embodiment of the inventive concepts.

FIGS. 12 and 13 are flow charts schematically illustrating a verification method including processor migration, according to an embodiment of the inventive concepts. The execution of a verification method including processor migration as shown by FIGS. 12-13 will be described as being performed by the SoC 410 as described with regard to FIG. 4. However, it should be noted that any SoC device that has a same or similar configuration as the SoC 410 may execute a verification method including processor migration according to the method shown in FIGS. 12-13. A SoC 410 includes a plurality of processors. A test program may be executed on each processor. Processor migration may be made between an initiating processor and a victim processor. The initiating processor is a processor that currently executes the test program, and the victim processor is a processor that will execute the test program after a processor switch.

FIG. 12 is a flow chart schematically illustrating an operation of an initiating processor during processor migration.

In operation S410, an initiating processor executes an exception-causing instruction while executing a test program. If the exception-causing instruction is executed, the initiating processor executes an exception handler.

In operation S420, the initiating processor including the exception handler inspects arguments included in the exception-causing instruction. If the arguments are inspected, the initiating processor determines whether or not processor migration is to occur.

In operation S430, after the initiating processor determines whether or not of processor migration should occur, the initiating processor including the exception handler stores a context of the initiating processor at an assigned area of the memory device 420.

In operation S440, the initiating processor sends an interrupt to the victim processor. According to various embodiments, during the processor migration, the victim processor is in a sleep-mode state and/or inactive state. In such embodiments, the initiating processor wakes up the victim processor in response to the interrupt, and the victim processor goes from the sleep-mode state and/or inactive state to an active state.

In operation S450, the initiating processor enters the sleep-mode state.

FIG. 13 is a flow chart schematically illustrating an operation of a victim processor during processor migration.

In operation S510, a victim processor receives an interrupt from an initiating processor. The victim processor wakes up and/or enters an active state in response to the interrupt.

In operation S520, the victim processor restores a context of the initiating processor stored in FIG. 12. An operation of the victim processor starts from a next instruction of an exception-causing instruction in a test program, depending on the restored context of the initiating processor.

In operation S530, the victim processor updates a mapping table described with reference to FIG. 8. Thus, the test program is executed with a processor switched.

Figure 14:
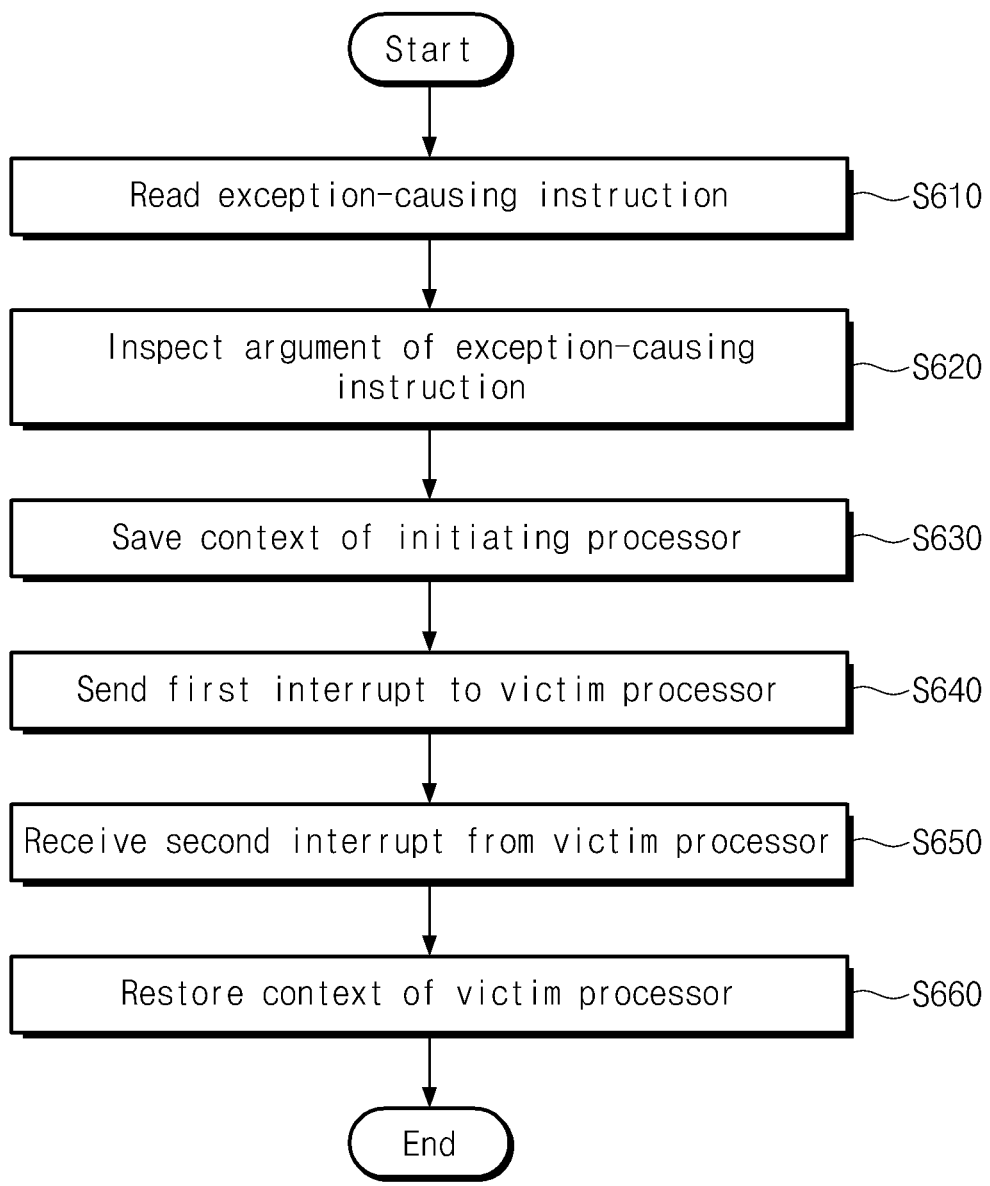
FIG. 14 is a flow chart schematically illustrating an operation of an initiating processor during processor swap according to an example embodiment of the inventive concepts.
Figure 15:
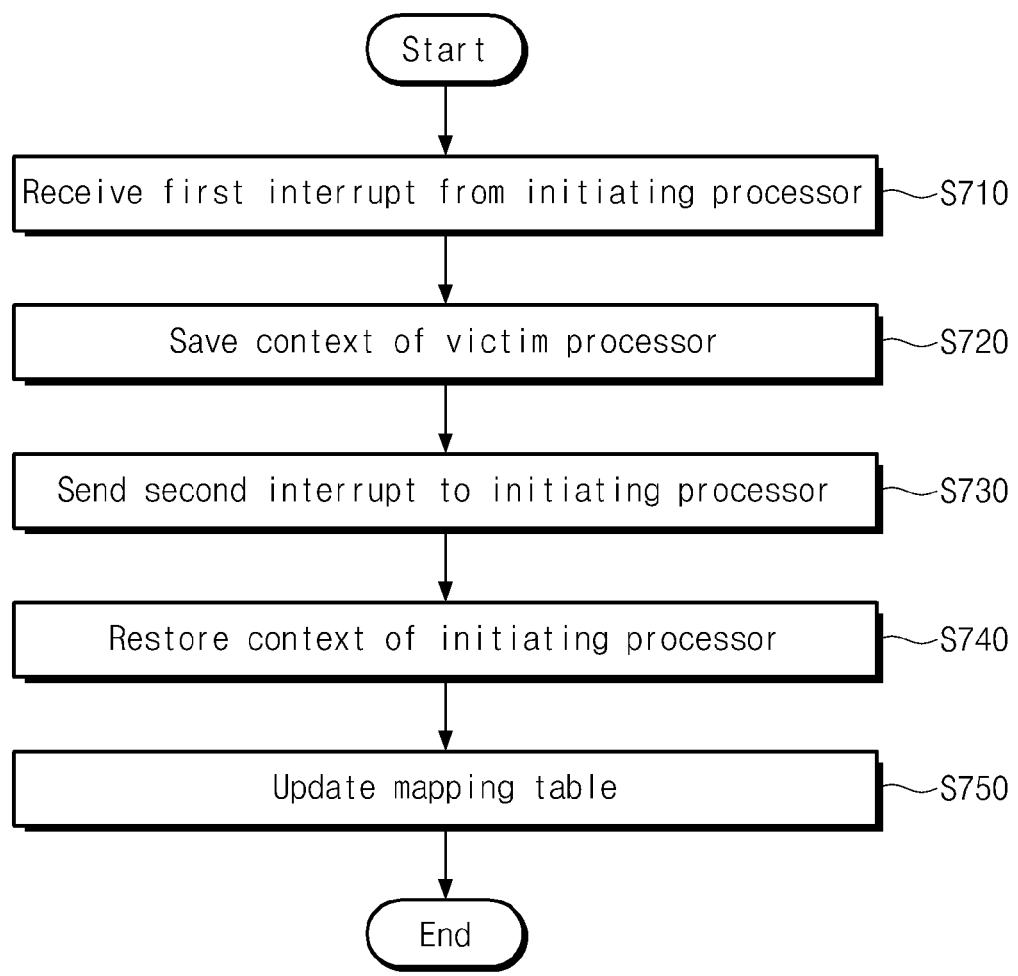
FIG. 15 is a flow chart schematically illustrating an operation of a victim processor during processor swap according to an example embodiment of the inventive concepts.

FIGS. 14 and 15 are flow charts schematically illustrating a verification method including processor swap, according to an embodiment of the inventive concepts. The execution of a verification method including processor swap as shown by FIGS. 14-15 will be described as being performed by the SoC 410 as described with regard to FIG. 4. However, it should be noted that any SoC device that has a same or similar configuration as the SoC 410 may execute a verification method including processor swap according to the method shown in FIGS. 14-15. A SoC 410 includes a plurality of processors. A test program may be executed on each processor. Processor swap may be made between an initiating processor and a victim processor. The initiating processor is a processor that points out a victim processor to exchange a test program, and the victim processor is a processor that will exchange the test program with the initiating processor.

FIG. 14 is a flow chart schematically illustrating an operation of an initiating processor during processor swap.

In operation S610, an initiating processor executes an exception-causing instruction while executing a test program. If the exception-causing instruction is executed, the initiating processor stops and/or pauses the test program for a moment and then executes an exception handler.

In operation S620, the initiating processor including the exception handler inspects arguments included in the exception-causing instruction. If the arguments are inspected, the initiating processor including the exception handler determines an intention about the processor swap.

In operation S630, when an intention about the processor swap is identified, the initiating processor including the exception handler stores a context of the initiating processor at an assigned area of the memory device 420.

In operation S640, the initiating processor sends a first interrupt to the victim processor. In various embodiments, during the processor swap, the victim processor is running any other test program. In such embodiments, the initiating processor sends an intention about the processor swap to the victim processor by means of the first interrupt.

In operation S650, the initiating processor receives a second interrupt from the victim processor. For example, the victim processor that receives the first interrupt in step S630 stores its own context at an assigned area of the memory device 420. Afterwards, the victim processor sends a second interrupt to the initiating processor. The initiating processor waits until the second interrupt is received.

In operation S660, the initiating processor restores the context of the victim processor stored at the memory device 420. Afterwards, the initiating processor executes the test program, which is executed by the victim processor depending on the context of the victim processor.

FIG. 15 is a flow chart schematically illustrating an operation of a victim processor during processor swap.

In operation S710, a victim processor receives a first interrupt from an initiating processor.

In operation S720, the victim processor stores a context of the victim processor at an assigned area of the memory device 420 in response to the first interrupt.

In operation S730, the victim processor sends a second interrupt to the initiating processor.

In operation S740, the victim processor restores a context of the initiating processor stored in FIG. 14. An operation of the victim processor starts from a next instruction of an exception-causing instruction in a test program that is executed by the initiating processor depending on the restored context of the initiating processor.

In operation S750, the victim processor updates a mapping table described with reference to FIG. 8. Thus, the test program that is executed by the initiating processor and the victim processor is exchanged between the initiating processor and the victim processor. That is, the test program executed by the initiating processor is executed with a processor switched.

Figure 16:
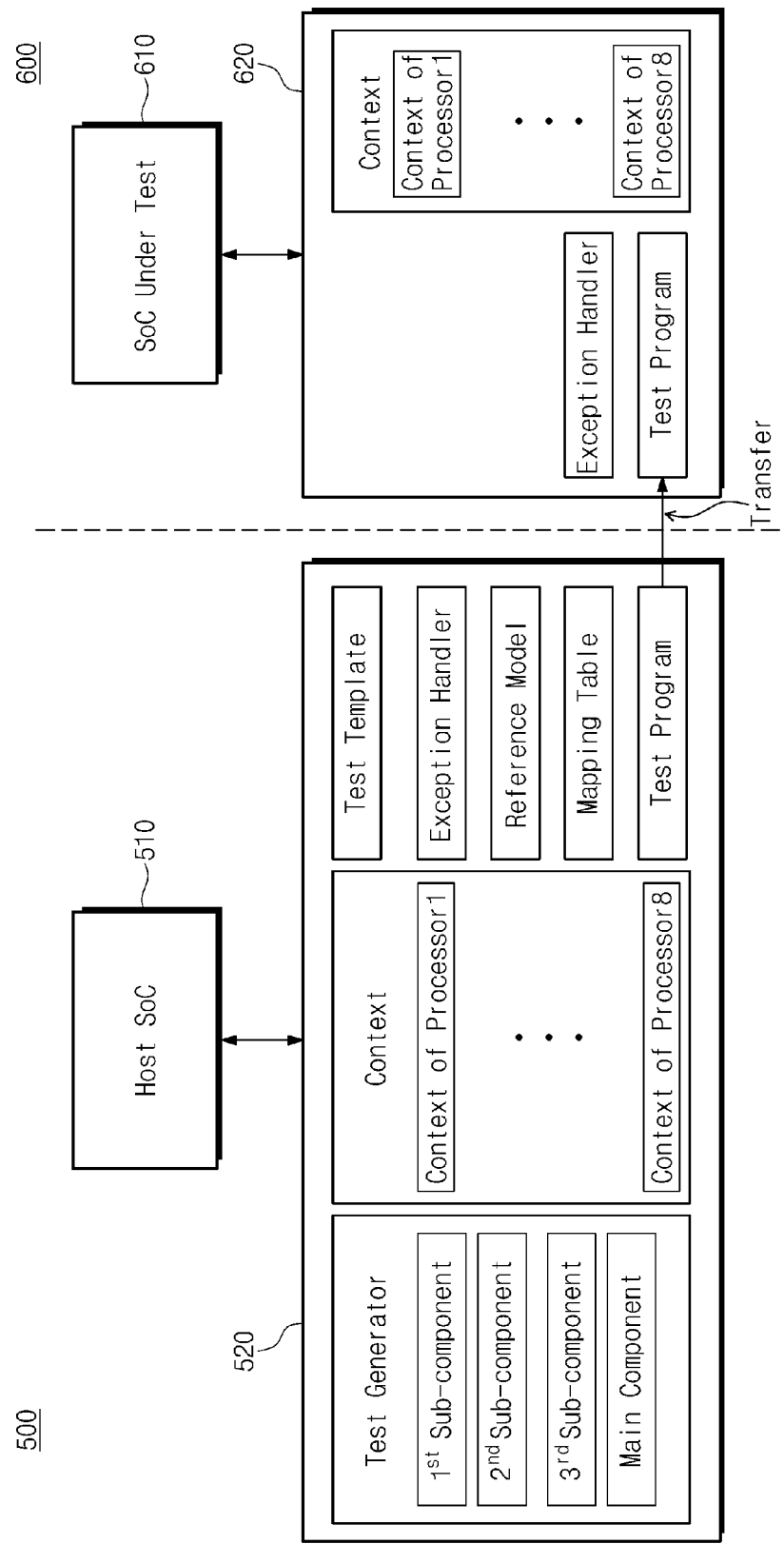
FIG. 16 is a block diagram schematically illustrating another embodiment of a configuration according to an example embodiment of the inventive concepts for verification of a system on chip.

FIG. 16 is a block diagram schematically illustrating another example embodiment of a configuration according to the inventive concepts for verification of a system on chip. Referring to FIG. 16, a host computing device 500 produces a test program and transfers it to a computing device 600 to be verified. The host computing device 500 contains a host system on chip (SoC) 510 and a host memory device 520. The computing device 600 to be verified contains a system on chip (SoC) 610 to be verified and a memory device 620 to be verified. The host SoC 510 and the SoC 610 to be verified contain a same or similar configuration as a system on chip 110 shown in FIG. 1.

The host memory device 520 stores a test template, a reference model, and a test generator. The reference model and the test generator may be program code and/or software modules. Once program code and/or software modules for the test generator are loaded from the memory device 520 into a processor of the SoC 510, the processor of the SoC 110 is programmed to perform the various operations and functions delineated by the program code of the test generator, thereby transforming the processor of the SoC 510 into special purpose processor. The processor including the test generator automatically generates a test program by means of the test template. An instruction that is produced when the test program is generated is fed into the reference model.

In various embodiments, the reference model may be configured referring to a processor included in the SoC 610 to be verified. For example, the reference model may be software that is obtained by modeling a processor included in the SoC 610 to be verified. The reference model provides information about a status change of a processor included in the SoC 610 to be verified when each instruction of the test program is executed. That is, the reference model outputs a modeling result that is obtained by tracing a status change of a processor included in the SoC 610 to be verified in response to the fed instruction. The reference model provides the test generator with the modeling result based on the fed instruction. The test generator generates a next instruction, based on the modeling result transferred from the reference model. The generated test program is provided to the computing device 600 to be verified.

In various embodiments, a third sub-component of the test generator generates instructions of the test program and then updates a state of the reference model. In such embodiments, the test generator may make various test environments.

The transferred test program is stored in a memory device 620 of the computing device 600 to be verified. The test program is executed on the SoC 610 to be verified. The SoC 610 to be verified performs a verification operation by means of the test program. A method of executing the test program is the same or similar to the verification operation method described with reference to FIG. 4, and for the sake of brevity, a description thereof is omitted.

FIG. 17 is a flow chart showing a test program generation method of a host SoC shown in FIG. 16 according to an example embodiment of the inventive concepts. The execution of the test program generation method as shown by FIG. 17 will be described as being performed by the SoC 510 as described with regard to FIG. 5. However, it should be noted that any SoC device that has a same or similar configuration as the SoC 510 may execute the test program generation method according to the method shown in FIG. 17. Referring to FIGS. 16 and 17, a processor included in a host SoC 510 generates a test program by means of a reference model.

In operation S805, the SoC 510 including the test generator reads an instruction statement included in a test template.

In operation S810, a first sub-component of the SoC 510 including the test generator determines whether a special condition is detected.

As a consequence of determining that a special condition is not detected, in operation S815, the SoC 510 including the test generator produces an instruction corresponding to the instruction statement.

In operation S820, the SoC 510 including the test generator feeds the generated instruction into a reference model.

As a consequence of determining that a special condition is detected, in operation S825, the SoC 510 including the test generator makes or otherwise generates an exception-causing instruction.

In operation S830, the SoC 510 including the test generator detects a switch intention about a processor included in the exception-causing instruction. In the event that the detection result indicates that the switch intention about a processor exists, the SoC 510 proceeds to operation S835. In the event that the detection result indicates that the switch intention about a processor does not exist, the SoC 510 proceeds to operation S840.

When the switch intention about a processor exists, in step S835, the SoC 510 including the test generator feeds a no operation instruction (hereinafter, referred to as NOP instruction) into the reference model. The NOP instruction changes a position of the reference model where a next command is to be generated, without a change in an operation state.

When the switch intention about a processor does not exist, in operation S840, the SoC 510 including the test generator feeds an exception-causing instruction into the reference model.

In operation S845, the SoC 510 including the test generator feeds a fixed instruction sequence included in an exception handler to the reference model.

In operation S850, the SoC 510 including the test generator obtains a changed state of the reference model due to instruction feed of operation S820, S835, or S845. The SoC 510 including the test generator applies the obtained the changed state of the reference model to generate a next instruction.

In operation S855, the SoC 510 including the test generator determines whether a test template includes an instruction statement to be next read. When the test template does not include an instruction statement to be next read, the SoC 510 including the test generator ends the test program. When the test template includes an instruction statement to be next read, the SoC 510 proceeds to operation S805, in which the SoC 510 including the test generator reads a next instruction statement.

According to the test program generation method, a processor included in the host SoC 510 generates a test program to which a variety of test environments are applied by means of the reference model.

A memory chip and a system on chip according to the inventive concepts may be packaged according to any of a variety of different packaging technologies. Examples of such packaging technologies may include the following: Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

While the inventive concepts have been described with reference to exemplary embodiments, it will be apparent to those skilled in the art that various changes and modifications may be made without departing from the spirit and scope of the inventive concepts. Therefore, it should be understood that the above example embodiments are not limiting, rather the above example embodiments are illustrative.

What is claimed is:

1. A method of generating a test program for verifying a system on chip, the system on chip including a processor, the method comprising:
    reading, by the processor, an instruction statement included in a test template;
    determining, by the processor, whether a special condition is included in the instruction statement;
    generating, by the processor, an instruction corresponding to the instruction statement if the determining determines that the special condition is not included in the instruction statement;
    providing, by the processor, the generated instruction to a reference model;
    generating, by the processor, an exception-causing instruction corresponding to the instruction statement if the determining determines that the special condition is included in the instruction statement;

providing, by the processor, the generated exception-causing instruction to the reference model;

obtaining, by the processor, a changed state of the reference model;

generating, by the processor, a next instruction based on the changed state of the reference model; and generating, by the processor, the test program including the instruction, the exception-causing instruction, and the next instruction, such that the exception-causing instruction in the test program, when executed by the processor, causes the processor to perform a fixed instruction sequence, the fixed instruction sequence including storing at least one context corresponding to the processor, wherein the generating the exception-causing instruction includes, determining whether a switch intention exists, the switch intention indicating that the processor is to switch one of a state of an instruction set, a privilege level of the instruction set, and a processor for processing the instruction set, and when the determining determines that the switch intention exists, determining whether the switch intention is one of a switch intention about the instruction set, a switch intention about the privilege level, and a switch intention about the processor.

2. The method of claim 1, wherein the generating the exception-causing instruction further comprises:

providing a no-operation-instruction to the reference model when the switch intention is the switch intention about the processor, the no-operation-instruction indicating to generate the next instruction without changing an operation state of the system on chip.

3. The method of claim 1, wherein the generating the exception-causing instruction further comprises:

providing an exception-causing instruction to the reference model when the switch intention is one of the switch intention about the instruction set and the switch intention about the privilege level; and providing a return address to the reference model, the return address being an address next to an address of the exception-causing instruction.

4. The method of claim 1, further comprising:

providing the generated test program to a second system on chip, and the second system on chip executes the generated test program to verify the second system on chip.

* * * * *